US006996505B1

(12) United States Patent
Edelsbrunner et al.

(10) Patent No.: US 6,996,505 B1
(45) Date of Patent: Feb. 7, 2006

(54) METHODS, APPARATUS AND COMPUTER PROGRAM PRODUCTS FOR AUTOMATICALLY GENERATING NURBS MODELS OF TRIANGULATED SURFACES USING HOMEOMORPHISMS

(75) Inventors: Herbert Edelsbrunner, Chapel Hill, NC (US); Ping Fu, Chapel Hill, NC (US); Dmitry Nekhayev, Durham, NC (US); Michael Facello, Carrboro, NC (US); Steve Williams, Raleigh, NC (US)

(73) Assignee: Raindrop Geomagic, Inc., Durham, NC (US)

( * ) Notice: Subject to any disclaimer, the term of this patent is extended or adjusted under 35 U.S.C. 154(b) by 1095 days.

(21) Appl. No.: 09/607,122

(22) Filed: Jun. 29, 2000

Related U.S. Application Data

(60) Provisional application No. 60/212,973, filed on Jun. 21, 2000.

(51) Int. Cl.
*G06F 7/60* (2006.01)
*G06F 17/10* (2006.01)
*G06F 101/00* (2006.01)

(52) U.S. Cl. .................. 703/2; 703/1; 703/6; 345/419; 345/428; 345/619

(58) Field of Classification Search ............... 703/1–2, 703/6; 345/419–428, 619
See application file for complete search history.

(56) References Cited

U.S. PATENT DOCUMENTS

| | | | |
|---|---|---|---|
| 4,719,585 A | 1/1988 | Cline et al. | 364/518 |
| 5,103,429 A | 4/1992 | Gelchinsky | 367/38 |
| 5,214,752 A | 5/1993 | Meshkat et al. | 395/123 |
| 5,278,948 A | 1/1994 | Luken, Jr. | 395/123 |
| 5,357,599 A | 10/1994 | Luken | 395/134 |

(Continued)

OTHER PUBLICATIONS

Heckbert et al, "Optimal Triangulation and Quadric-Based Surface Simplification," Computational Geometry: Theory and Applications, pp. 1-13 (1999)(paper available at http://citeseer,ist.psu.edu/heckbert99optimal.html).*

(Continued)

*Primary Examiner*—Samuel Broda
(74) *Attorney, Agent, or Firm*—Meyers Bigel Sibley & Sajovec PA

(57) ABSTRACT

Embodiments automatically generate an accurate network of watertight NURBS patches from polygonal models of objects while automatically detecting and preserving character lines thereon. These embodiments generate from an initial triangulation of the surface, a hierarchy of progressively coarser triangulations of the surface by performing a sequence of edge contractions using a greedy algorithm that selects edge contractions by their numerical properties. Operations are also performed to connect the triangulations in the hierarchy using homeomorphisms that preserve the topology of the initial triangulation in the coarsest triangulation. A desired quadrangulation of the surface can then be generated by homeomorphically mapping edges of a coarsest triangulation in the hierarchy back to the initial triangulation. This quadrangulation is topologically consistent with the initial triangulation and is defined by a plurality of quadrangular patches. These quadrangular patches are linked together by a (U, V) mesh that is guaranteed to be continuous at patch boundaries. A grid is then preferably fit to each of the quadrangles in the resulting quadrangulation by decomposing each of the quadrangles into $k^2$ smaller quadrangles. A watertight NURBS model may be generated from the resulting quadrangulation.

36 Claims, 14 Drawing Sheets

U.S. PATENT DOCUMENTS

| | | | |
|---|---|---|---|
| 5,440,674 A | 8/1995 | Park | 395/123 |
| 5,488,684 A | 1/1996 | Gharachorloo et al. | 395/123 |
| 5,506,785 A | 4/1996 | Blank et al. | 364/468 |
| 5,506,947 A | 4/1996 | Taubin | 395/133 |
| 5,537,519 A | 7/1996 | Vossler et al. | 398/120 |
| 5,550,960 A | 8/1996 | Shirman et al. | 395/130 |
| 5,552,992 A | 9/1996 | Hunter | 364/468.25 |
| 5,555,356 A | 9/1996 | Scheibl | 395/134 |
| 5,566,281 A | 10/1996 | Tokumasu et al. | 395/120 |
| 5,600,060 A | 2/1997 | Grant | 73/147 |
| 5,617,322 A | 4/1997 | Yokota | 364/468.04 |
| 5,668,894 A | 9/1997 | Hamano et al. | 382/242 |
| 5,701,404 A | 12/1997 | Stevens et al. | 395/123 |
| 5,726,896 A | 3/1998 | Jia et al. | 364/474.29 |
| 5,760,783 A | 6/1998 | Migdal et al. | 245/430 |
| 5,768,156 A | 6/1998 | Tautges et al. | 364/578 |
| 5,815,401 A | 9/1998 | Otsuki et al. | 364/474.31 |
| 5,850,229 A | 12/1998 | Edelsbrunner et al. | 345/473 |
| 5,870,220 A | 2/1999 | Migdal et al. | 359/216 |
| 5,883,631 A | 3/1999 | Konno et al. | 345/423 |
| 5,886,702 A | 3/1999 | Migdal et al. | 345/423 |
| 5,903,458 A | 5/1999 | Stewart et al. | 364/468.04 |
| 5,923,573 A | 7/1999 | Hatanaka | 364/578 |
| 5,929,860 A | 7/1999 | Hoppe | 345/419 |
| 5,945,996 A | 8/1999 | Migdal et al. | 345/420 |
| 5,963,209 A | 10/1999 | Hoppe | 345/419 |
| 5,966,133 A | 10/1999 | Hoppe | 345/420 |
| 5,966,140 A | 10/1999 | Popovic et al. | 345/441 |
| 5,966,141 A | 10/1999 | Ito et al. | 345/473 |
| 5,988,862 A | 11/1999 | Kacyra et al. | |
| 5,991,437 A | 11/1999 | Migdal et al. | 382/154 |
| 5,995,650 A | 11/1999 | Migdal et al. | 382/154 |
| 6,044,170 A | 3/2000 | Migdal et al. | 382/154 |
| 6,046,744 A | 4/2000 | Hoppe | 345/419 |
| 6,064,771 A | 5/2000 | Migdal et al. | 382/232 |
| 6,100,893 A | 8/2000 | Ensz et al. | 345/420 |
| 6,108,006 A | 8/2000 | Hoppe | 345/423 |
| 6,133,921 A | 10/2000 | Turkiyyah et al. | 345/420 |
| 6,176,427 B1 | 1/2001 | Antognini et al. | 235/454 |
| 6,198,979 B1 | 3/2001 | Konno | 700/98 |
| 6,201,546 B1 | 3/2001 | Bodor et al. | |
| 6,205,243 B1 | 3/2001 | Migdal et al. | 382/154 |
| 6,208,347 B1 | 3/2001 | Migdal et al. | 345/419 |
| 6,256,038 B1 | 7/2001 | Krishnamurthy | 345/419 |
| 6,256,039 B1 | 7/2001 | Krishnamurthy | 345/420 |
| 6,271,856 B1 | 8/2001 | Krishnamurthy | 345/429 |
| 6,278,460 B1 | 8/2001 | Myers et al. | 345/424 |
| 6,285,372 B1 | 9/2001 | Cowsar et al. | 345/425 |
| 6,313,837 B1 * | 11/2001 | Assa et al. | 345/420 |
| 6,377,865 B1 | 4/2002 | Edelsbrunner et al. | 700/98 |
| 6,417,860 B1 | 7/2002 | Migdal et al. | |
| 6,654,690 B2 | 11/2003 | Rahmes et al. | |

OTHER PUBLICATIONS

Ramaswami et al, "Converting Triangulations to Quadrangulations," Computational Geometry: Theory and Applications, pp. 1-27 (1995)(paper available at http://citeseer.ist.psu.edu/ramaswami95converting.html).*

Dey et al., "Topology Preserving Edge Contraction," Publications De L'Institut Mathematique, vol. 66, No. 80, 1999, pp. 23-45.

Eck et al., "Automatic Reconstruction of B-Spline Surfaces of Arbitrary Topological Type," Computer Graphics Proceedings, Annual Conference Series, SIGGRAPH 96, New Orleans, LA, Aug. 4-9, 1996, pp. 325-334.

Garland et al., "Surface Simplification Using Quadric Error Metrics," Computer Graphics Proceedings (SIGGRAPH), 1997, pp. 209-216.

Hagen et al, "Variational Design with Boundary Conditions and Parameter Optimized Surface Fitting," Geometric Modeling: Theory and Practice, Springer-Verlag, 1997, pp. 3-13.

Hsu et al., "Minimizing the Squared Mean Curvature Integral for Surfaces in Space Forms," Experimental Math, vol. 1, 1992, pp. 191-207.

Lee et al., MAPS: Multiresolution Adaptive Parameterization of Surfaces, Computer Graphics Proceedings (SIGGRAPH), 1998, pp. 95-104.

Nakamoto, Atsuhiro, "Diagonal Transformations in Quadrangulations of Surfaces," Journal of Graph Theory, vol. 21, No. 3, 1996, pp. 289-299.

Nakamoto Atsuhiro, "Diagonal Transformations and Cycle Parities of Quadrangulations on Surfaces," Journal of Combinatorial Theory, Series B 67, 1996, pp. 202-211.

Yang et al., "Segmentation of measured point data using a parametric quadric surface approximation," Computer-Aided Design 31, 1999, pp. 449-457.

Bajaj et al. "Automatic Reconstruction of Surfaces and Scalar Fields from 3D Scans," Computer Graphics Proceedings, Annual Conference Series, 1995, pp. 109-118.

Bajaj et al., "Modeling with Cubic A-Patches," ACM Transactions on Graphics, vol. 14, No. 2, Apr. 1995, pp. 103-133.

Bajaj et al., "The Contour Spectrum," IEEE, 1997, pp. 167-173.

Barequet, Gill "Piecewise-Linear Interpolation between Polygnoal Slices," Computer Vision and Image Understanding, vol. 63, No. 2, Mar. 1996, pp. 251-272.

Boissonnat, Jean-Daniel, "Geometric Structures for Three-Dimensional Shape Representation," ACM Transactions on Graphics, vol. 3, No. 1, Oct. 1984, pp. 267-286.

Boissonnat, Jean-Daniel, "Shape Reconstruction from Planar Cross Sections," Computer Vision, Graphics, and Image Processing, vol. 44, 1988, pp. 1-29.

Bowyer, A. "Computing Dirichlet tessellations", The Computer Journal, vol. 24, No. 2, 1981, pp. 162-166.

Curless et al., "A Volumetric Method for Building Complex Models from Range Images," Computer Graphics Proceedings, Annual Conference Series, 1996, pp. 303-312.

Elber et al., "Filleting and Rounding using Trimmed Tensor Product Surfaces," ACM, 1997, pp. 206-216.

Elber et al., "Tool Path Generation for Freeform Surface Models," ACM, 1993, pp. 419-428.

Elber et al., "Adaptive Isocurve-Based Rendering for Freeform Surfaces," ACM Transactions on Graphics, vol. 15, No. 3, Jul. 1996, pp. 249-263.

Edelsbrunner et al., "Incremental Topological Flipping Works for Regular Triangulations," Algorithmica, vol. 15, 1996, pp. 223-241.

Edelsbrunner et al., "Three-Dimensional Alpha Shapes," ACM Transactions on Graphics, vol. 13, No. 1, Jan. 1994, pp. 43-72.

Fuchs et al., "Optimal Surface Reconstruction from Planar Contours," SIGGRAPH 77: The Fourth Annual Conference on Computer Graphics and Interactive Techniques, San Jose, California, Jul. 20-22, 1977, pp. 693-702.

Forsey et al., "Surface Fitting with Hierarchiacal Splines," ACM Transactions on Graphics, vol. 14, No. 2, Apr. 1995, pp. 134-161.

Hoppe et al., "Piecewise Smooth Surface Reconstruction," Computer Graphics Proceedings, Annual Conference Series, 1994, pp. 295-302.

Hoppe et al., "Mesh Optimization," Computer Graphics Proceedings, Annual Conference Series, 1993, pp. 19-26.

Hoppe et al., "Surface Reconstruction from Unorganized Points," Computer Graphics, vol. 26, No. 2, Jul. 1992, pp. 71-78.

Joe, Barry, "Construction of three-dimensional Delaunay triangulations using local transformations," Computer Aided Geometric Design, vol. 8, 1991, pp. 123-142.

Krishnamurthy, et al., "Fitting Smooth Surfaces to Dense Polygon Meshes," SIGGRAPH 96, New Orleans, Louisiana, Aug. 4-9, 1996, pp. 313-324.

Loop, Charles, "Smooth Spline Surfaces over Irregular Meshes," Computer Graphics Proceedings, Annual Conference Series, 1994, pp. 303-310.

Meyers, David et al., "Surfaces from Contours," ACM Transactions on Graphics, vol. 11, No. 3, Jul. 1992, pp. 229-258.

Peters, Jorg, "C-Surface Splines," Siam, J. Numer. Anal., vol. 32, No. 2, Apr. 1995, pp. 645-666.

Staadt et al., "Multiresolution Compression and Reconstruction," IEEE, 1997, 2 pages.

Veltkamp, Remco, "Closed Object Boundaries from Scattered Points," CWI, Department of Interactive Systems, Amsterdam, The Netherlands, Aug. 1992, 149 pages.

Eck et al., "Automatic Reconstruction of B-Spline Surfaces of Arbitrary Topological Type," Computer Graphics Proceedings, Annual Conference Series, 1996, pp. 325-324.

Edelsbrunner et al., "Simulation and Simplicity: A Technique to Cope with Degenerate Cases in Geometric Algorithms," ACM Transactions on Graphics, vol. 9, No. 1, Jan. 1990, pp. 66-104.

Edelsbrunner, H., "A Acyclicity Theorem for Cell Complexes in d Dimension," Combinatorica, vol. 10, No. 3, 1990, pp. 251-260.

Lodha et al., "Scattered Data Techniques for Surfaces," Proceedings of a Dagstuhl Seminar, Scientific Visualization Dagstuhl '97, Hagen, Nielson and Post (eds.) pp. 189-230.

* cited by examiner

METHODS, APPARATUS AND COMPUTER PROGRAM PRODUCTS FOR AUTOMATICALLY GENERATING NURBS MODELS OF TRIANGULATED SURFACES USING HOMEOMORPHISMS

REFERENCE TO PRIORITY APPLICATION

This application claims priority to U.S. Provisional Application Ser. No. 60/212,973, filed Jun. 21, 2000, the disclosure which is hereby incorporated herein by reference.

FIELD OF THE INVENTION

This invention relates to methods, apparatus and computer program products for converting point cloud data into three-dimensional (3D) models of objects.

BACKGROUND OF THE INVENTION

Three-dimensional (3D) laser scanners and digitizers can be used successfully in applications such as reverse engineering. However, the data they generate, typically a series of x, y, z elements that which make up a point cloud, can be incompatible with many computer-aided-design (CAD) products. Moreover, many conventional CAD products have difficulty converting point cloud data into polygonal models or other modeling formats that can be used with conventional CAD products.

To address these limitations, tools have been designed to support more general geometric parameters including parametric surfaces. An example of a parametric surface includes non-uniform rational B-spline (NURBS) surfaces which are useful in CAD and computer-aided-manufacture (CAM) applications. One example of a tool for representing arbitrary parametric surfaces is disclosed in U.S. Pat. No. 5,555,356 to Scheibl, entitled "System and Method for Generating a Trimmed Parametric Surface for Display on a Graphic Display Device." In particular, the '356 patent discloses a method and system for representing an arbitrary parametric surface having one or more trimming polylines applied thereto. A quadrangular mesh coextensive with the parametric surface is generated. The quadrangular mesh has a plurality of edges and vertices coinciding with the line segments and points of the trimming polylines. In order to generate the quadrangular mesh, a two-dimensional array of U, V values is defined, wherein points in the array are adjusted to include the points of the trimming polylines. After all the points needing adjustment are adjusted, the points in the array are evaluated, thereby creating geometric coordinate values for each point in the array.

U.S. Pat. No. 5,903,458 to Stewart et al., entitled "System and Method for Forming Geometric Features Using Global Reparametrization," discloses a method that incorporates a global surface reparametrization scheme for the purposes of extending a conventional manipulation method to applications involving multiple surfaces and for reducing the geometric effect of parametric space distortions on surface features. This method reparametrizes multiple surface patches with a shared two-dimensional space defined in the object space of the model. The result is a geometrically consistent mesh, called a super-mesh, that serves as a global, uniform parametric space for topologically-disconnected, geometrically-disproportional surface patches. Spherical projection is also employed to perform patch reparametrization.

U.S. Pat. No. 5,923,573 to Hatanaka, entitled, "Three-Dimensional CAD System for Producing a Three-Dimensional Model," discloses kit models that have geometric shape data such as points, curved lines and curved surfaces as well as correlation data which indicates correlation of the geometric shape data. Responsive to modification information, a modification unit modifies the kit model. When a curved line within the geometric shape data is modified, other curved lines which intersect the modified curved line (as well as other components such as curved surfaces which include the modified curved line as a boundary line) are detected based on the correlation data and are modified accordingly. The modification unit moves or changes the object line based on the modification data and modifies, as the object line is modified, all points, curved lines and curved surfaces which intersect the object line. In this manner, a three-dimensional model is formed by modifying kit models stored in memory.

U.S. Pat. No. 5,552,992 to Hunter, entitled "Method and System for Reproduction of an Article From a Physical Model," discloses a method which uses a first algorithm implemented at an engineering workstation to create a first set of equations which represent a three-dimensional surface of the model from scan data. A second algorithm uses known wire frame data for a part (corresponding to the model) to compute a second set of mathematical equations. The wire frame data defines the various boundaries of the part and includes trim line data and feature line data. The first and second set of equations represent surfaces and characteristics of the model in a recorded format usable by CAD systems.

Attempts have also been made to address limitations associated with rendering complex geometric models at interactive rates. For example, U.S. Pat. No. 5,966,140 to Popovic et al., entitled "Method for Creating Progressive Simplicial Complexes," discloses a method for creating a generalized representation of an arbitrary geometric model using a progressive simplicial complex that permits topological changes in a geometric model. This method is described in the '140 patent as eliminating the conventional problem of rendering complex geometric models when the progressive mesh representations are all constrained to have the same topological type and, therefore, cannot be simplified into lower dimensional representations. Commonly assigned U.S. Pat. Nos. 5,929,860, 5,963,209, 5,966,133 and 6,046,744 to Hoppe also disclose techniques for constructing progressive meshes and for encoding, transmitting and refining progressive meshes.

Notwithstanding these prior art attempts to generate computer models of objects and surfaces thereon, there still continues to be a need for methods, apparatus and computer program products that can automatically translate polygonal models of objects having triangulated surfaces into watertight NURBS surfaces while simultaneously detecting and preserving character lines and points in an efficient manner.

SUMMARY OF THE INVENTION

Preferred methods, apparatus and computer program products can automatically generate an accurate network of watertight NURBS patches from polygonal models of objects while automatically detecting and preserving character lines thereon. According to one preferred embodiment of the present invention, these methods, apparatus and computer program products perform the operations of generating from an initial triangulation of the surface, a hierarchy of progressively coarser triangulations of the surface.

A coarsest triangulation in the hierarchy may correspond to a triangulation having a user-selected target number of triangles therein. Operations are also performed to connect the triangulations in the hierarchy using homeomorphisms that preserve the topology of the initial triangulation in the coarsest triangulation. A desired quadrangulation of the surface can then be generated by homeomorphically mapping edges of a coarsest triangulation in the hierarchy back to the initial triangulation and then matching pairs of adjacent triangles in the mapped coarsest triangulation (i.e., the triangulation that results when the edges of the coarsest triangulation are mapped back to the initial triangulation). Here, pairs of adjacent triangles are preferably matched using a weighting function (w) for edges of the triangles. The isolated triangles that cannot be matched in the mapped coarsest triangulation are preferably decomposed into three quadrangles (e.g., quadrangular patches) and each quadrangle derived from a matched pair of adjacent triangles may be decomposed into a mesh of four quadrangles. These latter operations are performed in order to generate a resulting quadrangulation that is topologically consistent with the initial triangulation and is defined by a plurality of quadrangular patches. These quadrangular patches are linked together by a (U, V) mesh that is guaranteed to be continuous at patch boundaries. A grid is then preferably fit to each of the quadrangles in the resulting quadrangulation by decomposing each of the quadrangles into $k^2$ smaller quadrangles, where k is a positive integer greater than one. The value of k can be user specified to provide variable grid density. If necessary, a watertight NURBS model may be generated from the resulting quadrangulation using conventional techniques, for example.

Another preferred embodiment of the present invention may perform the operations of generating from an initial "fine" triangulation of the surface, a hierarchy of progressively coarser triangulations of the surface by decimating the initial triangulation using a sequence of edge contractions that are prioritized by a quadratic error function (e.g., e(x)). This quadratic error function preferably measures a respective error caused by each of the edge contractions in the sequence. During the decimating operation, the hierarchy of progressively coarser triangulations are connected or linked together by homeomorphisms. These homeomorphisms are preferably simplicial homeomorphisms; however, with some modification more general homeomorphisms may also be used. Edges of a coarsest triangulation in the hierarchy are then homeomorphically mapped back to the initial triangulation. According to a preferred aspect of this embodiment, the generating operation comprises generating a first triangulation from the initial triangulation by contracting a first edge in the initial triangulation and measuring a first quadratic error ($e_1(x)$) associated with the first edge contraction. The operations for connecting the triangulations also preferably include generating a first simplicial homeomorphism ($\iota_1$) for the first triangulation by determining a fuzzy rank R of a submatrix Q of a fundamental quadric used by the quadratic error function e(x) to measure the first error ($e_1(x)$).

According to yet another embodiment of the present invention, an initial triangulation of a model (i.e., polygonal model) is decomposed into a quadrangulation of the model that is defined by a plurality of quadrangular patches. These quadrangular patches are joined together at patch boundaries in a continuous watertight manner. This decomposition operation preferably includes generating a hierarchy of progressively coarser triangulations of the model from the initial triangulation of the model, by performing a sequence of edge contractions to the initial triangulation using a greedy algorithm that selects edge contractions by their numerical properties. As these triangulations are generated, respective homeomorphisms ($\iota$) are computed which link or connect the triangulations together. These homeomorphisms are then used to generated a new homeomorphism. In particular, a composition of the homeomorphisms ($\iota$) for the triangulations in the hierarchy is generated as a new homeomorphism ($\eta$) and an inverse of this homeomorphism ($\eta^{-1}$) is then used to map edges of the coarsest triangulation in the hierarchy back to the initial triangulation. After mapping, this coarsest triangulation is converted into a desired quadrangulation by, among other things, matching pairs of adjacent triangles (e.g., eliminating a common edge between triangles that share the common edge).

These above-described embodiments of the present invention can automatically decompose a first triangulated surface of the model (e.g., polygonal model) into a second quadrangulated surface that is homeomorphic to the first triangulated surface and is defined by a plurality of quadrangular patches that are joined together at patch boundaries. These embodiments can eliminate the need to create cross-sections or manually generate quadrangular patches one by one. Subject to a user defined grid density specification, a continuous (U, V) grid that is continuous at all patch boundaries may also be automatically generated. A NURBS surface may then be automatically generated over the quadrangular patches. This automatic decomposition operation preferably comprises decimating the first triangulated surface through a sequence of edge contractions that are prioritized by a quadratic error measure. The quadratic error measure may be based on a coefficient map that weights planes defined by triangles on the first triangulated surface by a geometric measure of the triangles, including one based on angles or area.

The above described embodiments also preferably perform hole filling operations in the event the initial triangulation of a model is generated from defective or incomplete point cloud data. Hole filling operations according to one embodiment preferably comprise detecting a hole within a first triangulated surface of an object by identifying a plurality of first triangles therein having respective first edges that are not shared by another triangle but collectively define a boundary around an enclosed area devoid of triangles. The hole is then initially filled with a second triangulated surface. This initial hole filling operation may be performed using conventional techniques, for example.

According to a preferred aspect of these hole filling operations, the quality of the second triangulated surface is then improved by (i) refining the second triangulated surface into a third triangulated surface having a higher density of triangles therein relative to the second triangulated surface and then (ii) decimating the third triangulated surface into a fourth triangulated surface having a lower density of triangles therein relative to the third triangulated surface. The fourth triangulated surface preferably has fixed vertices on the boundary and floating vertices off the boundary. This latter decimating operation is preferably performed using an algorithm that favors generation of equilateral triangles when edges of triangles in the third triangulated surface are contracted. This decimating operation may also use a preselected range of triangle densities as a constraint.

The fourth triangulated surface and a portion of the first triangulated surface surrounding the hole is then covered with a quadrangular NURBS patch. The floating vertices are then projected onto the quadrangular NURBS patch. These projected floating vertices and the fixed vertices can then be used to construct a fifth triangulated surface which in combination with the first triangulated surface reflects an accurate approximation of the object without the hole. According to another embodiment, a fifth triangulated surface may be generated from the fourth triangulated surface using an energy minimization operation that evaluates a local measurement of shape selected from the group consisting of dihedral angles between adjacent triangles, face angles around vertices and linear expressions of curvature (e.g., discretized versions of derivatives and second derivatives along paths).

Preferred embodiments of the present invention also perform patch shuffling operations on a first quadrangulation by reconfiguring the first quadrangulation into a second quadrangulation defined by a second plurality of quadrangular patches that are joined together at second patch boundaries. This reconfiguring operation includes performing a plurality of conventional local transformations (e.g., edge slide, face contraction and vertex rotation, etc.) on a first plurality of quadrangular patches in the first quadrangulation so that a deficiency associated with the second quadrangulation is less than a deficiency associated with the first quadrangulation. More preferably, the reconfiguring operation includes performing a plurality of local transformations on the first plurality of quadrangular patches so that a potential $\Phi_2(Q)$ associated with the second quadrangulation is less than a potential $\Phi_1(Q)$ associated with the first quadrangulation, where $\Phi_n(Q)=K\Delta_n(Q)+F_n(Q)$, $K \geq 2$, $\Delta_n(Q)$ represents a deficiency of a respective nth quadrangulation and $F_n(Q)$ represents the number of quadrangular patches in the respective nth quadrangulation.

According to still further embodiments of the present invention, templates may be used to simplify operations for generating NURBS surfaces when working with polygonal models of related objects. In these embodiments, a first quadrangulation of a first object may be applied as a template to a point cloud or triangulated surface representation of a second object that is different from the first object. The template may then be modified by adjusting a shape of the first patch boundary mesh associated with the first quadrangulation to more closely conform to the surface representation of the second object.

Figure 12:
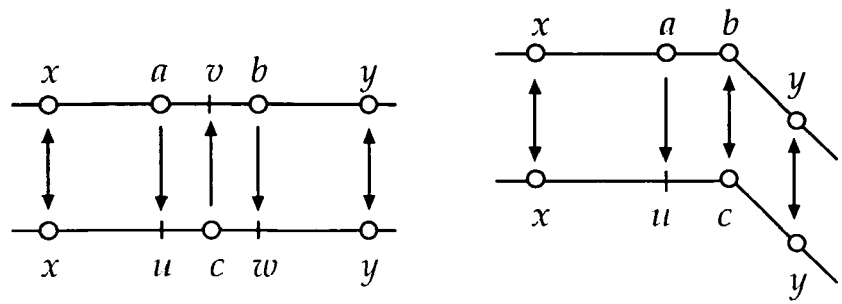

On the left side of FIG. 12, ab, xc, cy are cut into two each. On the right hand side of FIG. 12, only xc is cut into two. After subdivision, the number of edges before and after the contraction are the same.

Figure 13:
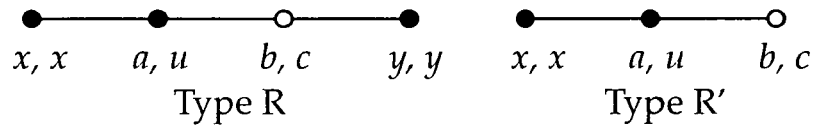
Figure 13:
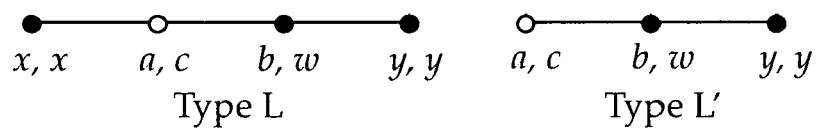
Figure 13:
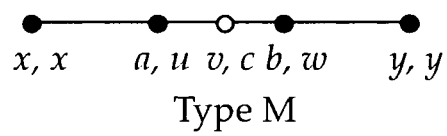

In FIG. 13, five types of isomorphic subdivisions: R, R' map b to c, L, L' map a to c, and M is a compromise.

Figure 14:
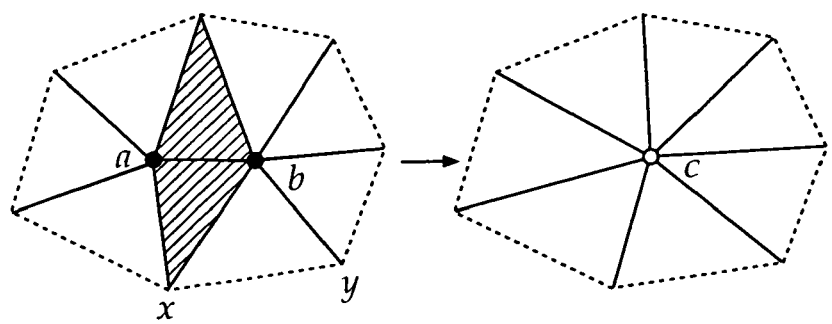

FIG. 14 illustrates a contraction of edge ab to c. The shaded triangles belong to the star of ab and they disappear in the process.

Figure 15:
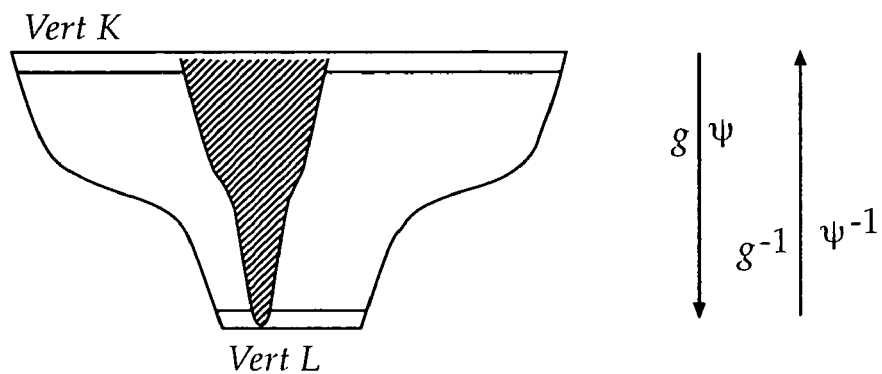

In FIG. 15, the vertex map is computed by following paths from the leaf-to-root level. The inverse follows paths in the opposite direction.

Figure 16:
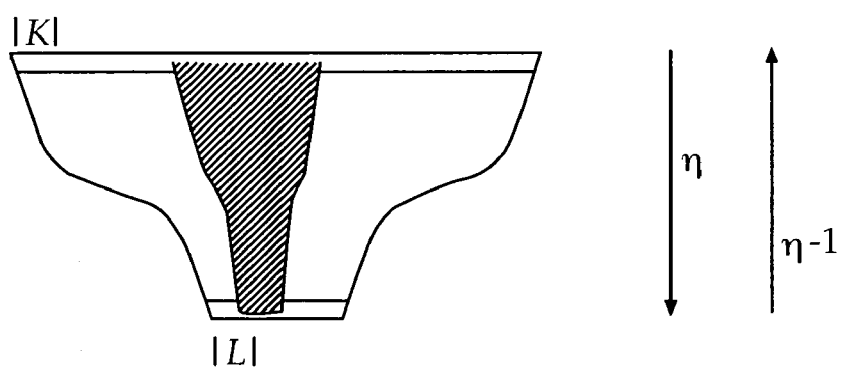

In FIG. 16, the binary forest represents both the simplicial map ψ and the simplicial homeomorphism η.

Figure 17:
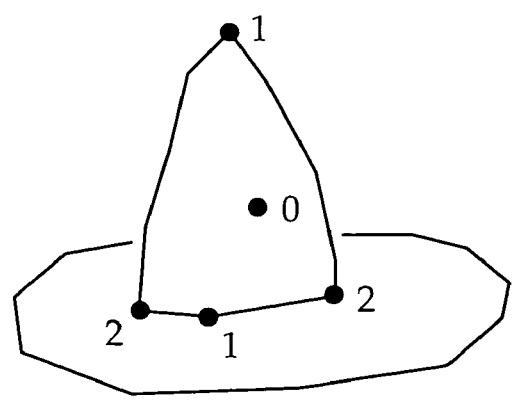

In FIG. 17, the shark-fin complex consists of two disks, one glued along a piece of its boundary to an interior path of the other.

Figure 18:
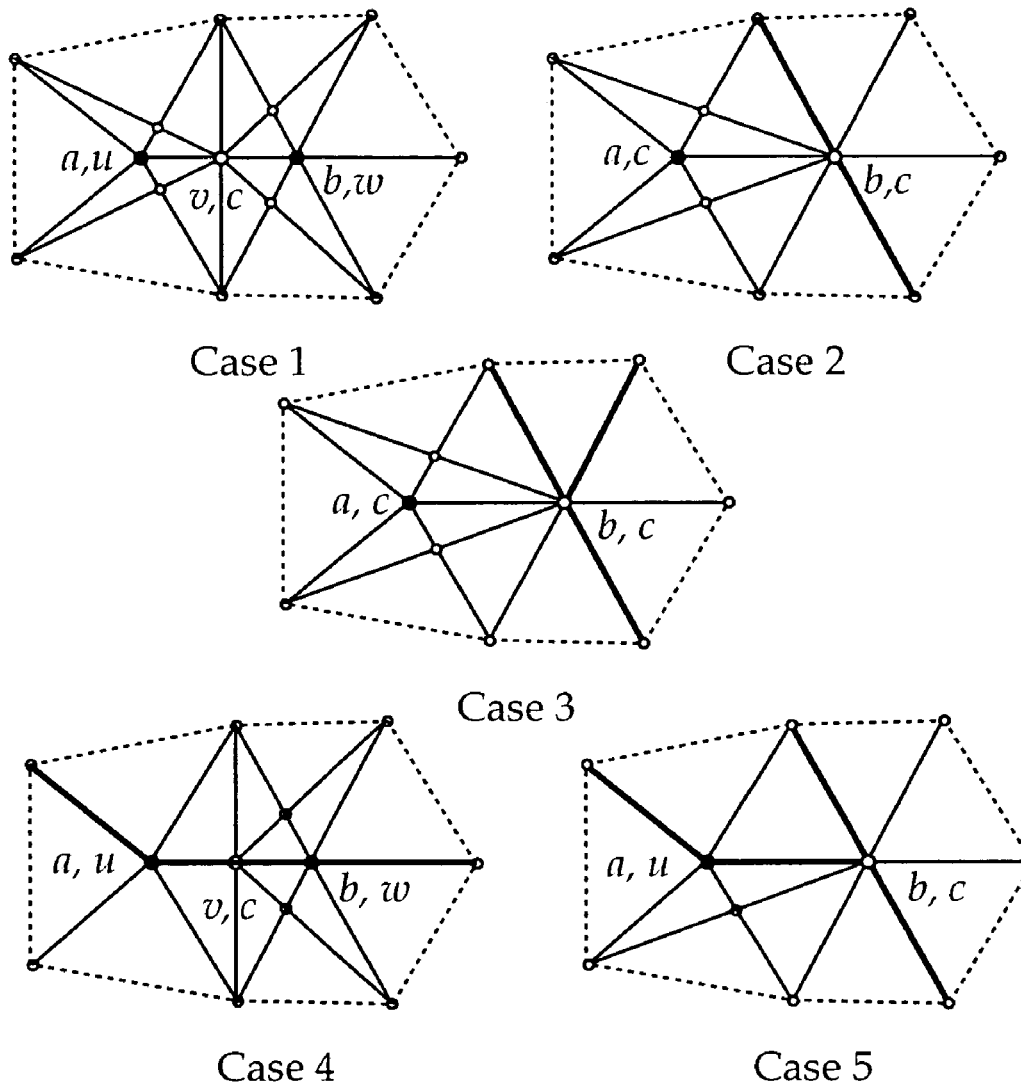

FIG. 18 illustrates five cases distinguished by topological constraints. These constraints are imposed by the 1-st boundary indicated in the figure by bold edges.

Figure 19:
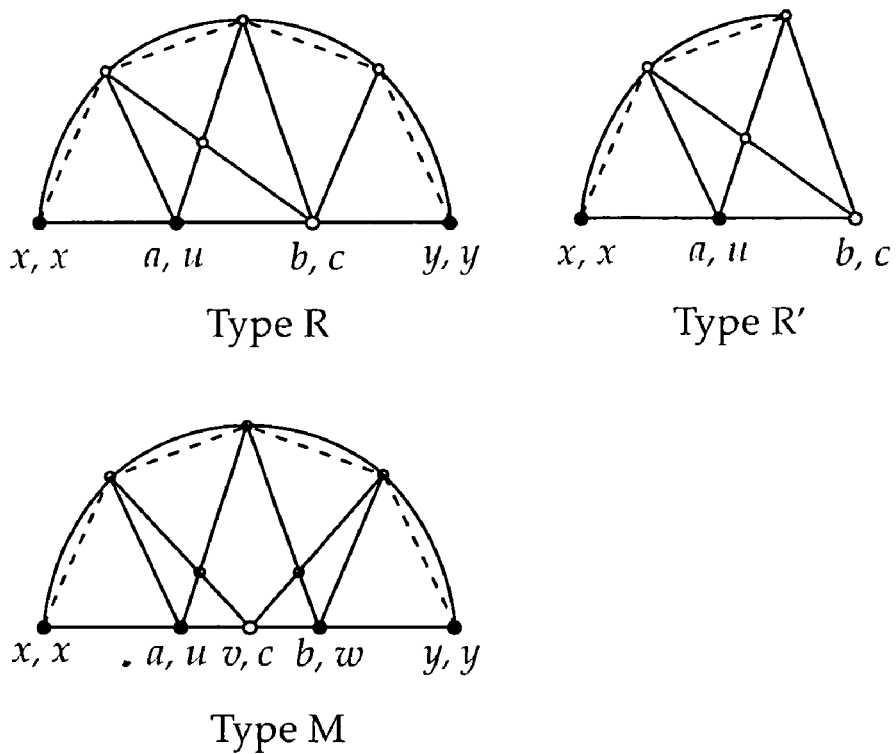

In FIG. 19, three of the five types of isomorphic subdivisions for half-disks are illustrated: Types L and L' are symmetric to R and R' and not shown.

Figure 20:
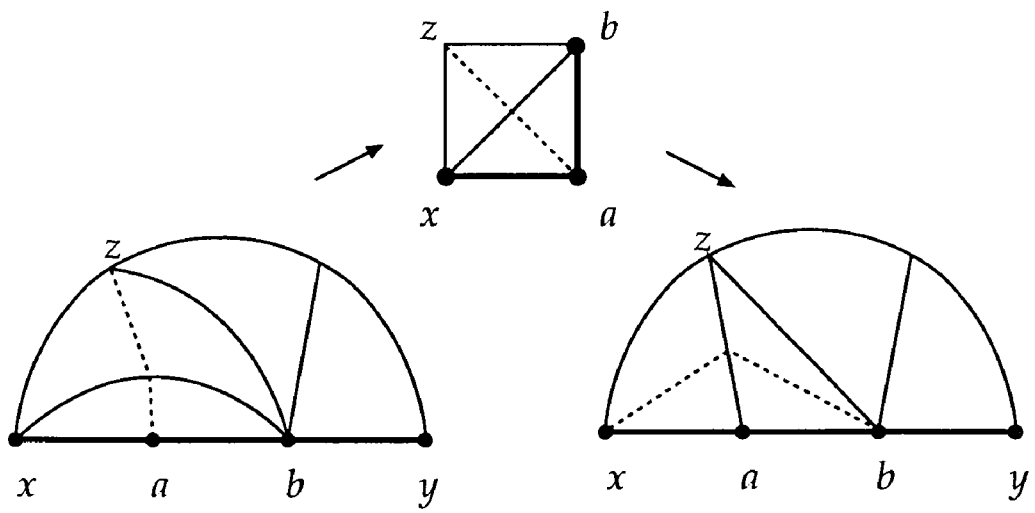

In FIG. 20, edge xb is flipped to az in order to apply the half-disk construction of isomorphic subdivisions.

Figure 21:
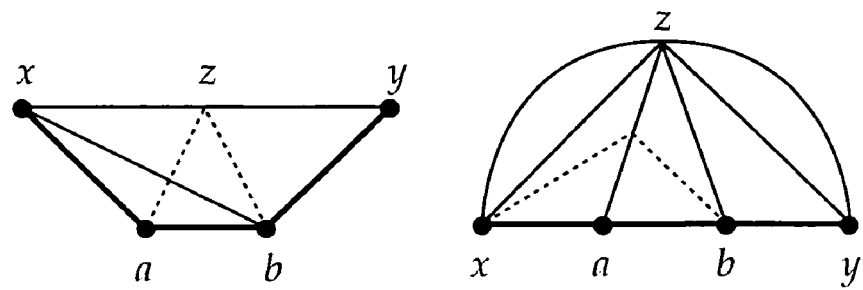

In FIG. 21, a minimal half-disk consists of two triangles, xba, xby. By cutting along two new edges, za and zb, a configuration amenable to the half-disk construction of isomorphic subdivisions is obtained.

Figure 22:
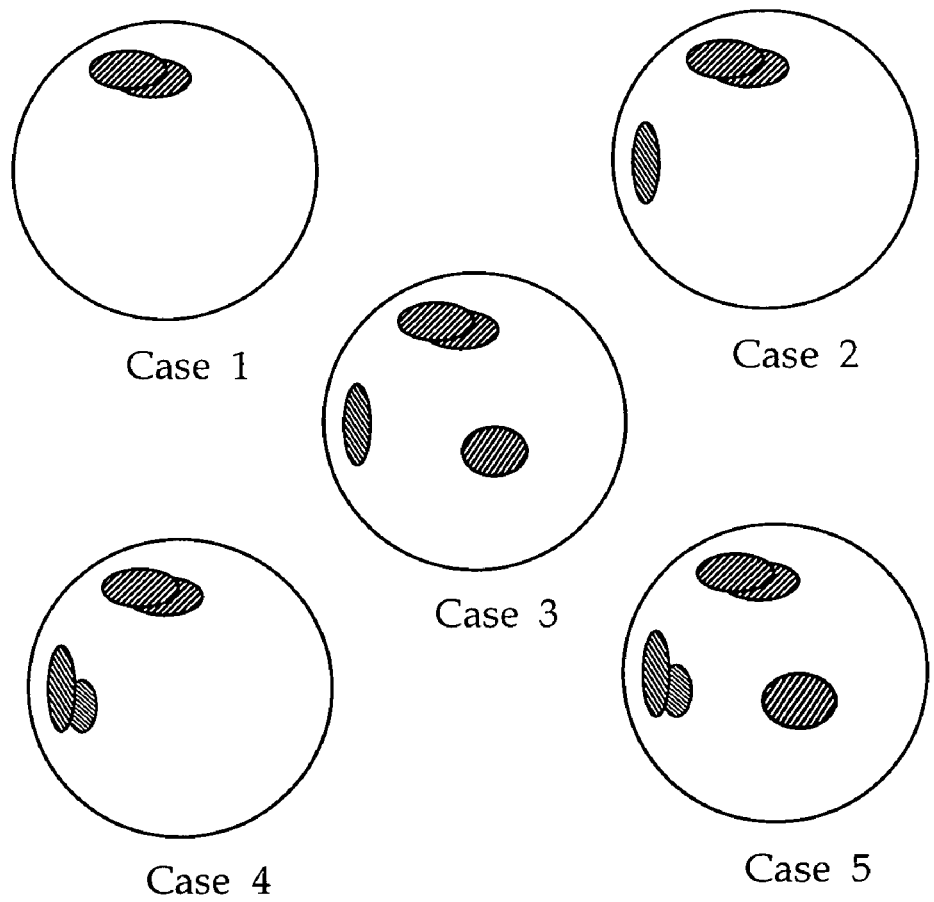
Figure 23:
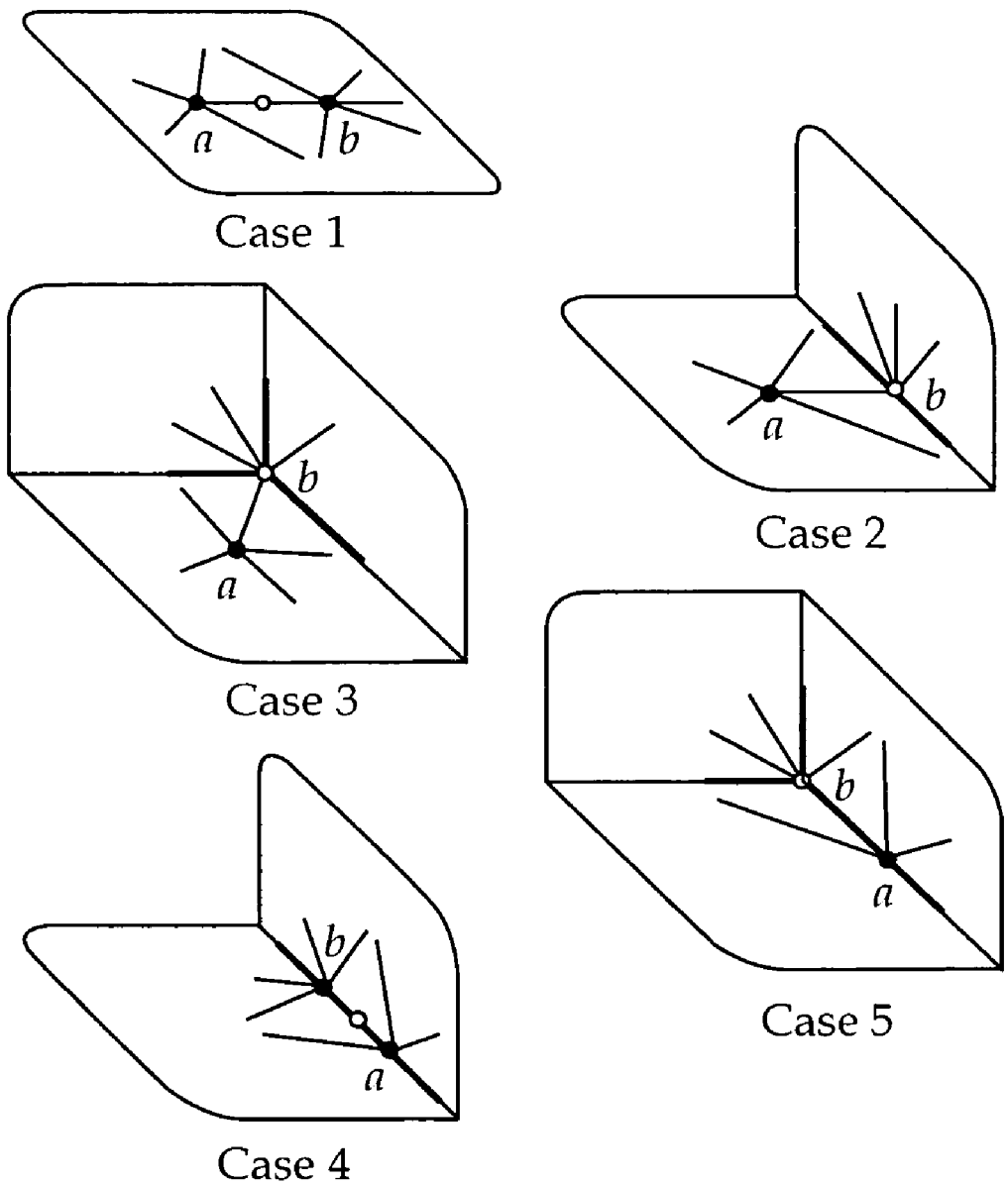

In FIG. 22, the five spheres of directions correspond to the numerically likely edge contractions in FIG. 23.

FIG. 23 illustrates five numerically likely cases of fuzzy rank evolutions. In each case the position of the new vertex, c, is marked with a hollow circle.

Figure 24:
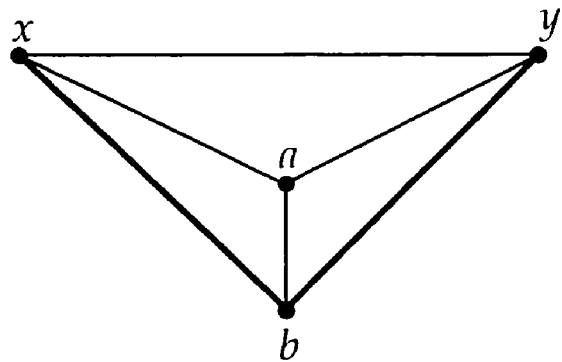

In FIG. 24, the disk of three triangles cannot be cut into two half-disks because bx, by both belong to the 1-st boundary.

Figure 25:
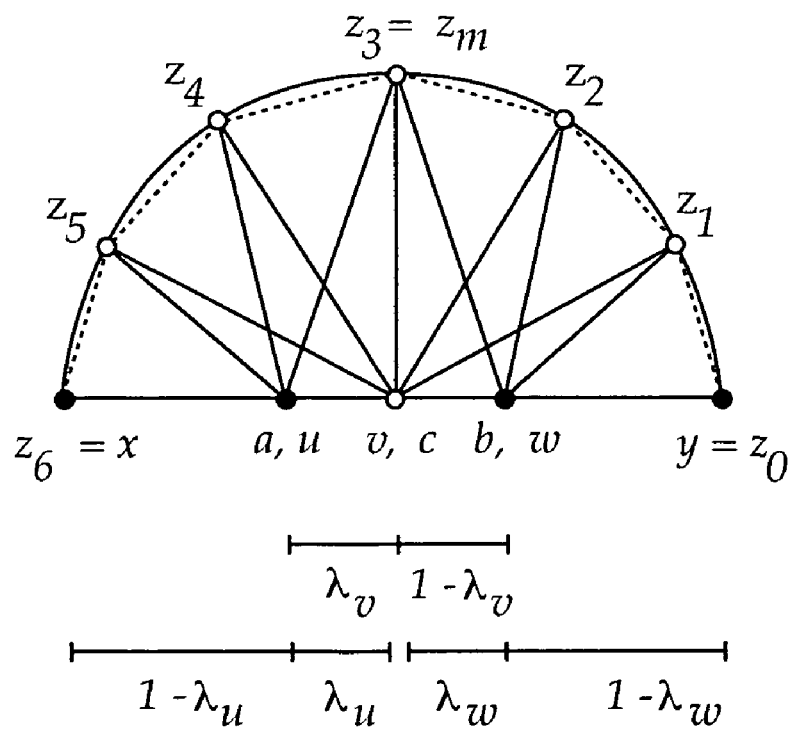

In FIG. 25, the canonical representation of the half-disks defines $\iota_i$ by identifying points with their images.

Figure 26:
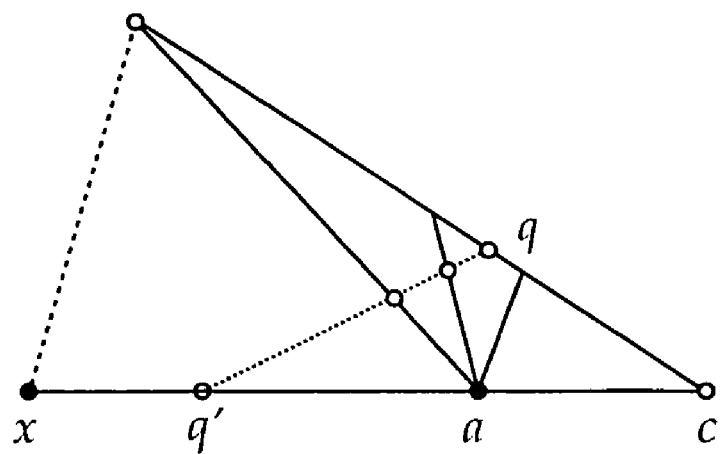

In FIG. 26, a line segment qq' passing through a triangle in C' can pass through several triangles of E'.

Figure 27:
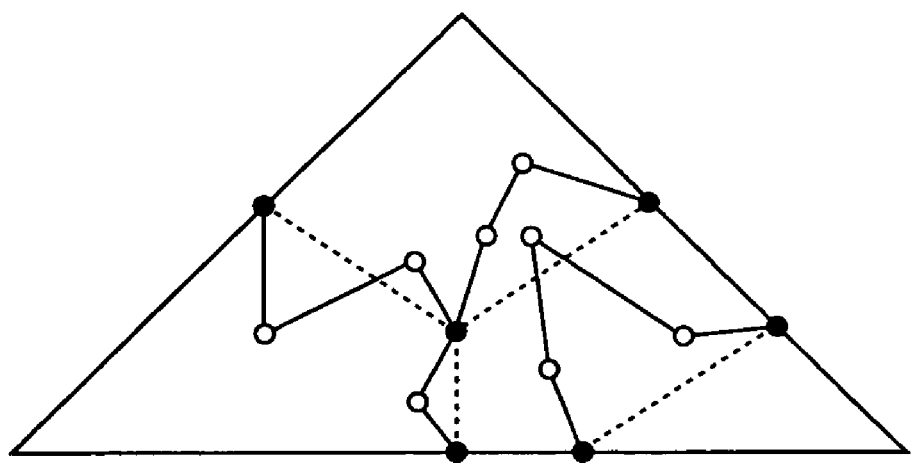

In FIG. 27, the segments of the initial graph are solid, the knees are hollow, and the segments of the straightened graph with knees removed are dashed.

Figure 28:
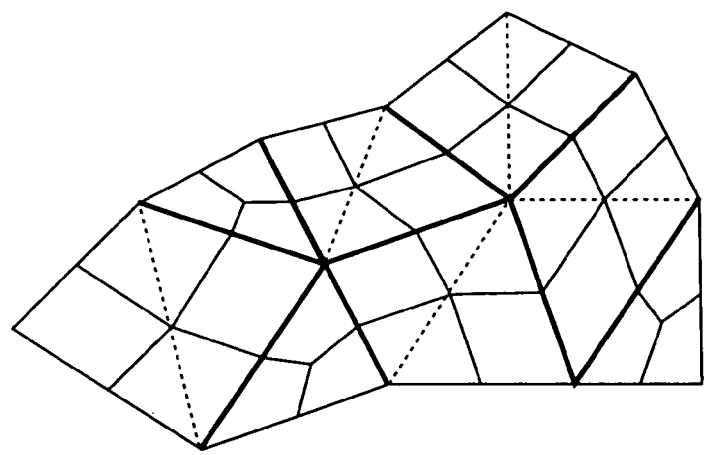

In FIG. 28, solid edges belong to the quadrilaterals obtained by first matching triangles across dotted edges and second decomposing each quadrilateral into four and each remaining triangle into three quadrilaterals.

Figure 29:
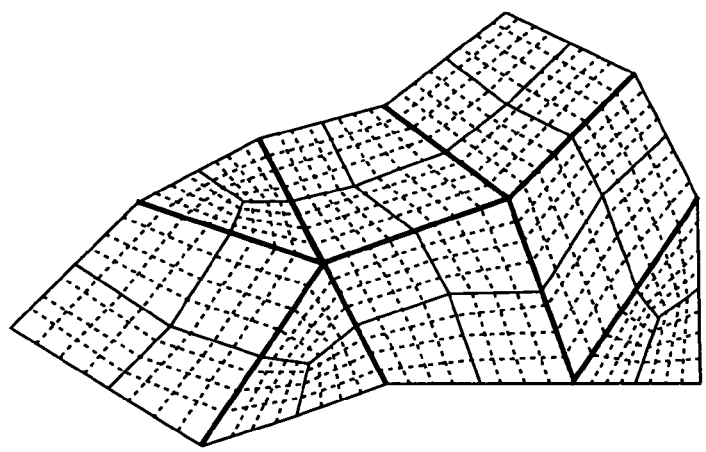

In FIG. 29, each domain in FIG. 28 is decomposed into a grid of 16 quadrilaterals.

Figure 30:
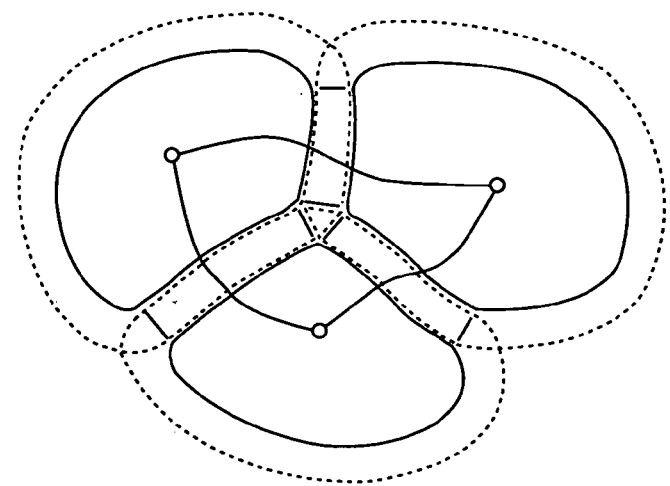

FIG. 30 illustrates the preimage of a triangle under the simplicial homeomorphism and the preimages of the three vertices, their stars, the connecting edges, and the connecting triangle under the simplicial map.

DESCRIPTION OF A PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The operations of the present invention, as described more fully hereinbelow and in the accompanying figures, may be performed by an entirely hardware embodiment, an entirely software embodiment or an embodiment combining software and hardware aspects. Furthermore, the present invention may take the form of a computer program product on a computer-readable storage medium having computer-readable program code embodied in the medium. Any suitable computer-readable medium may be utilized including hard disks, CD-ROMs or other optical or magnetic storage devices. Like numbers refer to like elements throughout.

Various aspects of the present invention are illustrated in detail in the following figures, including flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Figure 1:
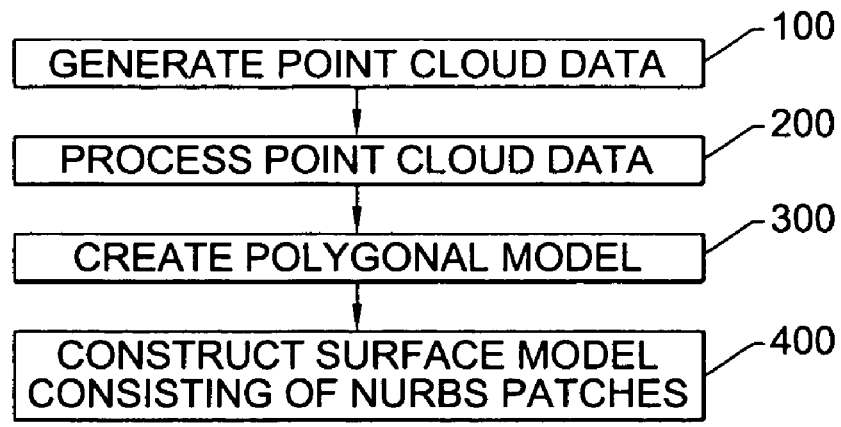
FIG. 1 is a flow diagram of operations that illustrate preferred embodiments that generate a NURBS model of an object.

Referring now to FIG. 1, preferred embodiments that generate watertight non-uniform rational B-spline (NURBS) models of three-dimensional objects perform first operations to automatically convert point cloud data files into precise polygonal models, Blocks 100, 200 and 300. These point cloud data files, Block 100, may be generated using conventional techniques for scanning physical objects. The data files may also be provided in an ASCII xyz data format by conventional digitizers, including those manufactured by Cyberware™, Digibotics™, Laser Design™, Steinbichler™, Hymarc™ and Minolta, for example. Preferred examples of these first operations are more fully described in commonly assigned U.S. application Ser. No. 09/248,587, filed Feb. 11, 1999, entitled "Method of Automatic Shape Reconstruction", the disclosure of which is hereby incorporated herein by reference. These first operations may also include techniques to generate a Delaunay complex of point cloud data points. Techniques to generate Delaunay complexes are more fully described in commonly assigned U.S. Pat. No. 5,850,229 to Edelsbrunner et al., entitled "Apparatus and Method for Geometric Morphing", the disclosure of which is hereby incorporated herein by reference. The point processing operations illustrated by Block 200 may include point manipulation techniques such as "erase" for removing a set of selected points, "crop" for removing all selected points, "sample" for selecting a percentage of points and "add points" for adding points to the point set using a depth plane.

Figure 2:
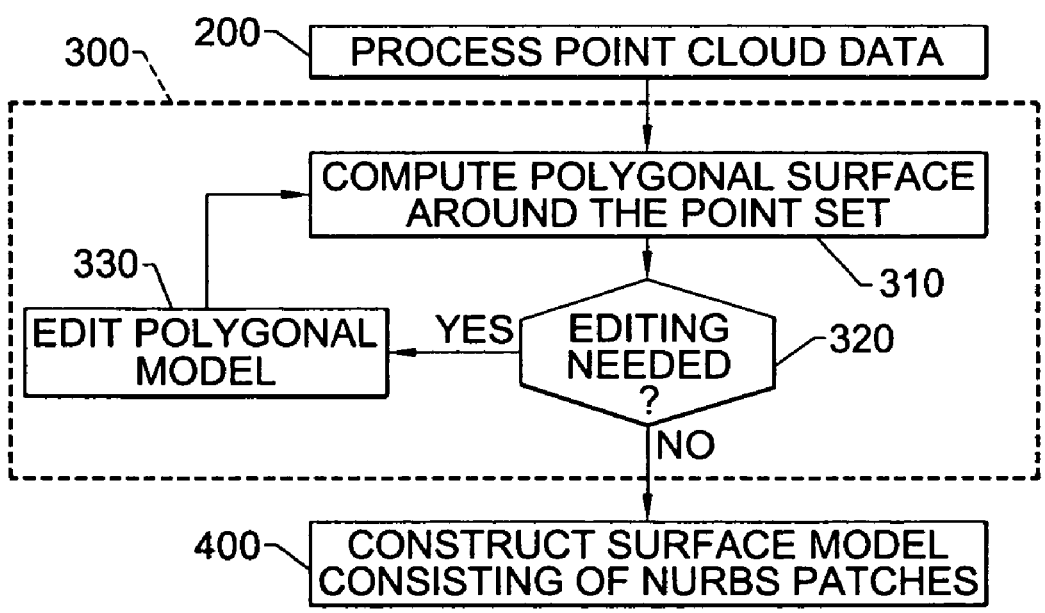
FIG. 2 is a flow diagram of operations that illustrate preferred embodiments that generate polygonal models from point cloud data.

The operations for creating polygonal models, as illustrated by Block 300, use geometric techniques to infer the shape of the model from a set of data points in a point cloud data file. In particular, as illustrated by FIG. 2, the operation of creating a polygonal model preferably includes building a Wrap™ model of the point set using strict geometric rules to create a polygonal surface (e.g., triangulated surface) around the point set that actually passes through the points, Block 310. The initial model may or may not have the desired surface quality. In particular, organic physical objects often produce models having excellent surface quality and frequently require no further editing. However, models generated from noisy or incomplete scanning data may require manual editing, Blocks 320 and 330. Preferred editing operations include "push shallow", "push deep" and "push through" which specify local tightening actions on the surface of the model that remove extraneous regions. Additional editing operations include "fill edges", "fill up" and "fill layer" to fill in regions of the model where volume is missing. An editing operation "relax" can also be used to smooth the polygonal surface by moving points and the operation "refine" can be used to smooth the polygonal surface by inserting new points and smoothing them. An operation "thicken" can be used to thicken a surface of the model by a desired amount and an operation "decimate" can be used to reduce the number of triangles in the polygonal model while maintaining important features of the model, including curvature. Operations such as "straighten edge" and "flatten plane" enable definition of important features of the model that may have been lost when a physical object was scanned. The operations described above with respect to Blocks 200 and 300 are provided by commercially available software, Geomagic Wrap 4.0™, manufactured by Raindrop Geomagic, Inc. of Research Triangle Park, N.C., assignee of the present application.

Although a surface in $\mathbb{R}^3$ may be represented as a collection of triangles meeting along shared edges and vertices, the triangulated surface may offer little in terms of decomposition into features or functional parts, both being subjective concepts that vary between application areas. Accordingly, the polygonal model generated at Block 300 is used to construct a more preferred surface model comprising non-uniform rational B-spline (NURBS) patches, Block 400. Alternatively, a preferred surface model comprising NURBS patches may be generated from a polygonal model represented in any one of the following formats: OBJ, STL, DXF, 3DS and VRML, or other formats. A discussion of conventional techniques for translating from a fine triangulation to a coarse quadrangulation is provided in an article by M. Eck et al., entitled "Automatic Reconstruction of B-Spline Surfaces of Arbitrary Topological Type," Computer Graphics Proceedings (SIGGRAPH), pp. 325–334 (1996).

Figure 5:
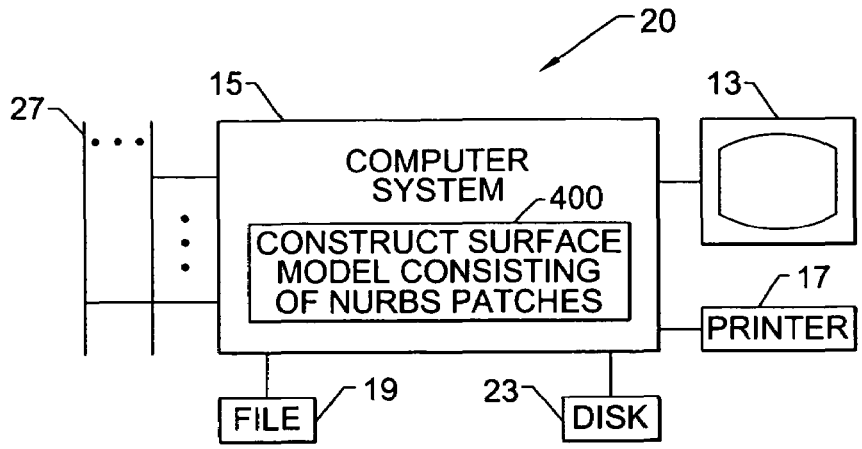
FIG. 5 is a general hardware description of a computer workstation comprising software and hardware for constructing surface models comprising NURBS patches in accordance with embodiments of the present invention.

Referring now to FIG. 5, a general hardware description of a computer workstation is illustrated comprising, among other things, software and hardware for performing conventional operations such as processing point cloud data and creating polygonal models from the point cloud data, and for constructing surface models comprising NURBS patches in accordance with embodiments of the present invention. The workstation 20 preferably includes a computer 15 that may accept a point cloud data representation of an object via a file 19, disk input 23 or data bus 27. A display 13 and a printer 17 are also preferably provided to assist in performing the operations illustrated by FIG. 1. The hardware design of the above described components 13, 17, 19, 27 and 23 is well known to those having skill in the art and need not be described further herein.

Figure 3:
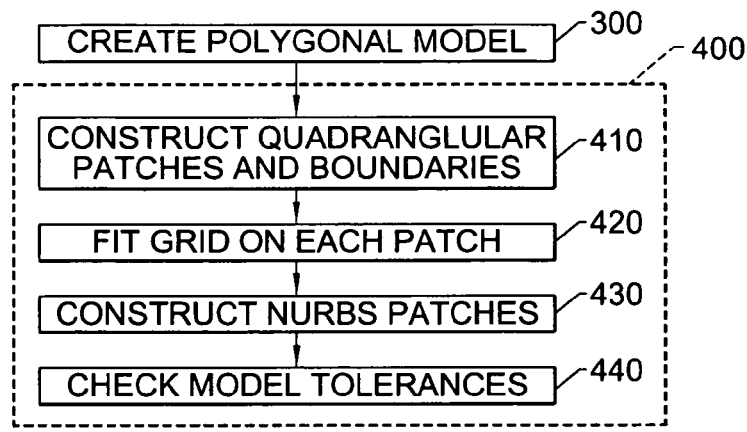
FIG. 3 is a flow diagram of operations that illustrate preferred embodiments that construct NURBS models from polygonal models.

Referring now to FIG. 3, operations performed by Block 400 of FIG. 1 include constructing quadrangular patch boundaries, Block 410, from the polygonal model. This initial operation includes automatically decomposing the polygonal model into a plurality of 4-sided quadrangular patches that make up a quadrangulation having the same topology as the polygonal model. Each quadrangular patch is preferably bounded by four (4) polylines that are traced out on the polygonal surface as a continuous (U, V) grid. These polylines are referred to herein as patch boundaries. Using an iterative process, patch density requirements may be specified and key features of the model (i.e., character lines) are automatically specified as constraints and preserved. Character lines are lines on the model that express hard features or areas of high curvature change, for example.

As illustrated by Block 420, an operation is then performed to automatically fit a respective grid on each patch. Once an initial grid has been placed on a patch, it may be influenced using manual operations. Such manual operations include "add flow line" whereby a flow line is drawn on a grid and used to influence nearby grid lines and thereby locally modify the grid layout. Another manual operation includes "modify grid points" which can be used to move individual grid nodes while smoothly affecting other grid nodes in the local neighborhood. Referring now to Block 430, an operation is then performed to construct NURBS patches. This operation preferably includes constructing a respective NURBS patch (e.g., tensor product NURBS patch) over each gridded patch. Here, the boundaries between neighboring patches are guaranteed to be the same so that the surface model is watertight. Model tolerance can then be checked, Block 440, on the NURBS surface model using an operation that compares an original point set with the surface model and provides numerical and/or graphical evaluation of the proximity of the NURBS surface to the point set. The NURBS surface model can then be output as an IGES 128 file that can be imported into Pro/E or other CAD/CAM packages for further processing. As described more fully hereinbelow, these operations for generating a surface model comprising non-uniform rational B-spline (NURBS) patches preserve shape topology, adapt to local curvature and identify features.

Figure 4:
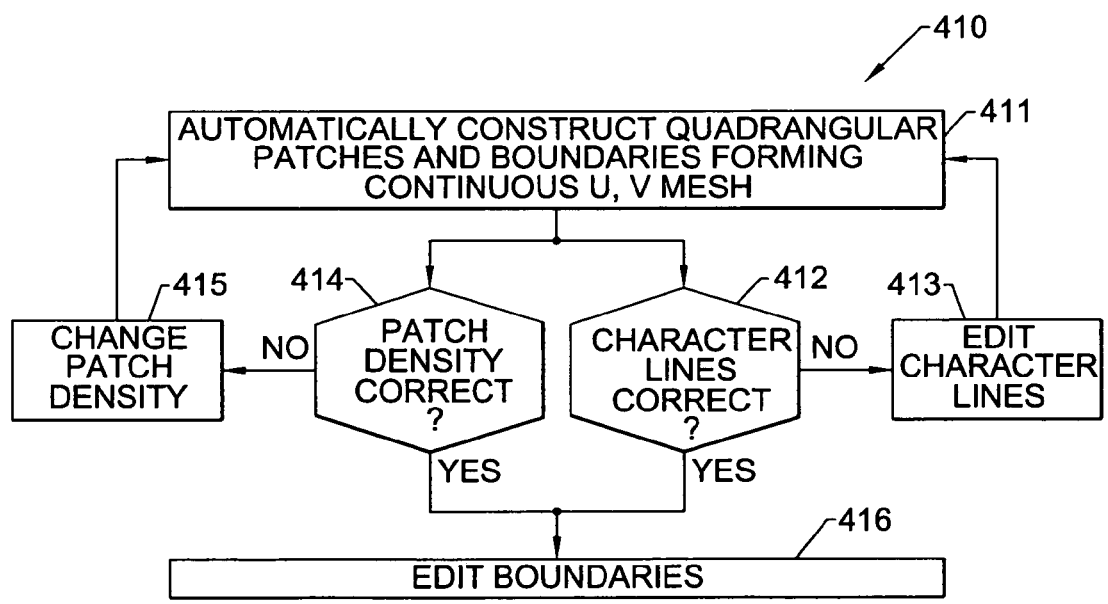
FIG. 4 is a flow diagram of operations that illustrate preferred embodiments that construct quadrangular patches and boundaries.

Referring now to FIG. 4, a more detailed set of operations associated with the operation of constructing quadrangular patch boundaries, Block 410, will be described. In particular, Block 411, illustrates operations to construct patch boundaries by automatically laying out quadrangular patches on the model to obtain an initial boundary structure. This operation can have a plurality of goals, including preserving important character lines of the model and establishing a fairly well-shaped and well-structured network of patches. An operation may then be performed to determine the accuracy of any character lines, Block 412. If necessary, character lines can be added, removed or adjusted, Block 413. For example, character lines can be added a number of different ways. A first way is to promote a current patch boundary or set of boundaries to the level of a character line and thereby preserve the particular character line in any future recompositions. A second way a character line can be added is by automatically computing a character line based on curvature considerations that may be set by a user. A third way to add a character line is to manually draw a character line on the model surface. Other techniques may also be used.

As illustrated by the return path from Block 413 to Block 411, once a change in the character lines has been made, the patch boundaries are reconstructed. The operations of Blocks 414 and Block 415 illustrate another technique for modifying the patch structure by changing the density (or number) of patches on the model. This operation can be performed locally (for a selected group of patches) or globally. For example, in a region with few interesting features, it may be desireable to decrease the number of patches, while regions with more detail may require a larger number of patches. As with character line addition, the patch structure can be recomputed after the patch density has been changed. As illustrated by Block 416, notwithstanding the automated nature of the operations to construct patch boundaries, manual techniques (e.g., dragging) may also be used to perform final edits to the boundaries. The operations described above with respect to Block 400 may be provided by commercially available, software Geomagic Shape 2.0™, manufactured by Raindrop Geomagic, Inc. of Research Triangle Park, N.C., assignee of the present application.

Figure 6:
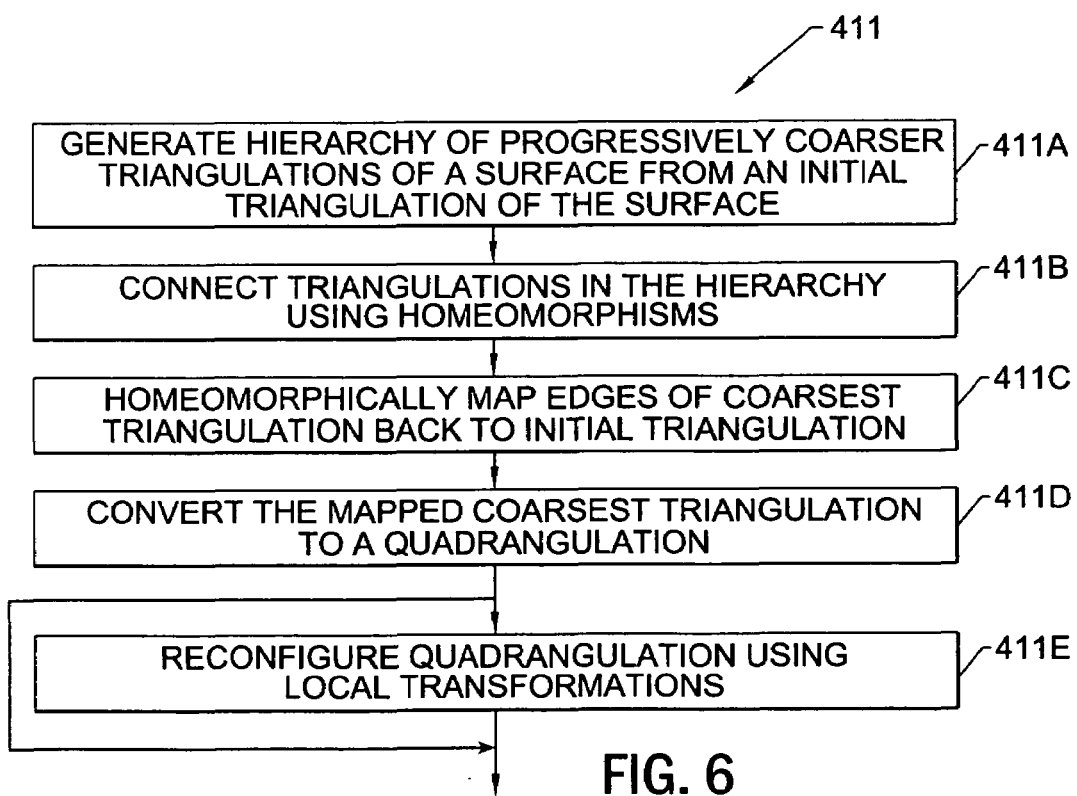
FIG. 6 is a flow diagram of operations for constructing a preferred quadrangulated surface model from a polygonal model, according to embodiments of the present invention.

Referring now to FIGS. 1, 3 and 6, preferred methods, apparatus and computer program products that automatically generate an accurate network of watertight NURBS patches from polygonal models of objects while automatically detecting and preserving character lines thereon, Block 400, will be described. These methods, apparatus and computer program products can perform the operations of generating from an initial triangulation of the surface, a hierarchy of progressively coarser triangulations of the surface, Block 411A. A coarsest triangulation in the hierarchy may correspond to a triangulation having a user-selected target number of triangles therein. A discussion of using a conventional decimation hierarchy to produce a parametrization on a finely triangulated surface may be found in an article by A. Lee et al., entitled "MAPS: Multiresolution Adaptive Parameterization of Surfaces," Computer Graphics Proceedings (SIGGRAPH), pp. 95–104 (1998).

Operations are also performed to connect the triangulations in the hierarchy using homeomorphisms that preserve the topology of the initial triangulation in the coarsest triangulation, Block 411B. A desired quadrangulation of the surface can then be generated by homeomorphically mapping edges of a coarsest triangulation in the hierarchy back to the initial triangulation and then matching pairs of adjacent triangles in the mapped coarsest triangulation (i.e., the triangulation that results when the edges of the coarsest triangulation are mapped back to the initial triangulation), Blocks 411C and 411D. Here, pairs of adjacent triangles are preferably matched using a weighting function (w) for edges of the triangles. The isolated triangles that cannot be matched in the mapped coarsest triangulation are preferably decomposed into three quadrangles and each quadrangle derived from a matched pair of adjacent triangles may be decomposed into a mesh of four quadrangles. These latter operations, Blocks 411C and 411D, are performed in order to generate a resulting quadrangulation that is topologically consistent with the initial triangulation and is defined by a plurality of quadrangular patches. These quadrangular patches are linked together by a (U, V) mesh that is guaranteed to be continuous at patch boundaries. A grid is then preferably fit to each of the quadrangles in the resulting quadrangulation by decomposing each of the quadrangles into $k^2$ smaller quadrangles, where k is a positive integer greater than one, Block 420. The value of k can be user specified to provide variable grid density. If necessary, a watertight NURBS model may be generated from the resulting quadrangulation using conventional techniques, for example, Block 430. One such conventional technique for replacing quadrangles within a quadrangulation by a NURBS patch is disclosed in an article by M. Krishnamurty et al., entitled "Fitting Smooth Surfaces to Dense Polygonal Meshes," Computer Graphics Proceedings (SIGGRAPH), pp. 313–324 (1996).

The embodiments for modeling a surface of an object may perform the operations of generating from an initial "fine" triangulation of the surface, a hierarchy of progressively coarser triangulations of the surface by decimating the initial triangulation using a sequence of edge contractions that are prioritized by a quadratic error function (e.g., e(x)). A discussion of performing edge contraction using a quadratic error measure as a guide may also be found in an article by M. Garland et al., entitled "Surface Simplification Using Quadric Error Metrics," Computer Graphics Proceedings (SIGGRAPH), pp. 209–216 (1997). A discussion of the mathematics associated with topology preserving edge contraction (extended to 3-manifold surfaces) can also be found in an article by Tamal K. Dey et al., entitled "Topology Preserving Edge Contraction," Publications De L'Institut Mathematique, Vol. 66, pp. 2–345 (1999), the disclosure of which is hereby incorporated herein by reference.

Figure 7:
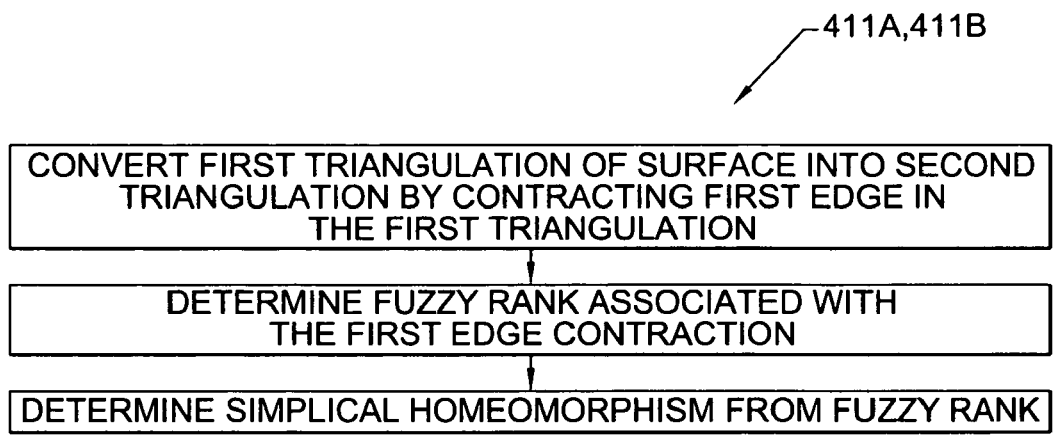
FIG. 7 is a flow diagram of operations for determining simplicial homeomorphisms according to embodiments of the present invention.

This quadratic error function preferably measures a respective error caused by each of the edge contractions in the sequence. During the decimating operation, the hierarchy of progressively coarser triangulations are connected or linked together by homeomorphisms. These homeomorphisms are preferably simplicial homeomorphisms; however, with some modification more general homeomorphisms may also be used. Edges of a coarsest triangulation in the hierarchy are then homeomorphically mapped back to the initial triangulation, Block 411C. According to a preferred aspect of this embodiment and as illustrated by FIG. 7, the generating operation may comprise generating a first triangulation from the initial triangulation by contracting a first edge in the initial triangulation and measuring a first quadratic error ($e_1(x)$) associated with the first edge contraction. The operations for connecting the triangulations also preferably include generating a first simplicial homeomorphism ($t_1$) for the first triangulation by determining a fuzzy rank R of a submatrix Q of a fundamental quadric used by the quadratic error function e(x) to measure the first error ($e_1(x)$).

According to additional aspects of embodiments of the present invention, an initial triangulation of a model (i.e., polygonal model) is decomposed into a quadrangulation of the model that is defined by a plurality of quadrangular patches. These quadrangular patches are joined together at patch boundaries in a continuous watertight manner. This decomposition operation preferably includes generating a hierarchy of progressively coarser triangulations of the model from the initial triangulation of the model, by performing a sequence of edge contractions to the initial triangulation using a greedy algorithm that selects edge contractions by their numerical properties. As these triangulations are generated, respective homeomorphisms ($\iota$) are computed which link or connect the triangulations together. These homeomorphisms are then used to generated a new homeomorphism. In particular, a composition of the homeomorphisms ($\iota$) for the triangulations in the hierarchy is generated as a new homeomorphism ($\eta$) and an inverse of this homeomorphism ($\eta^{-1}$) is then used to map edges of the coarsest triangulation in the hierarchy back to the initial triangulation. After mapping, this coarsest triangulation is converted into a desired quadrangulation by, among other things, matching pairs of adjacent triangles (e.g., eliminating a common edge between triangles that share the common edge), Block 411D.

These above-described embodiments of the present invention can automatically decompose a first triangulated surface of the model (e.g., polygonal model) into a second quadrangulated surface that is homeomorphic to the first triangulated surface and is defined by a plurality of quadrangular patches that are joined together at patch boundaries. These embodiments eliminate the need to create cross-sections or manually generate quadrangular patches one by one. Subject to a user defined grid density specification, a continuous (U, V) grid that is continuous at all patch boundaries may also be automatically generated, as illustrated by FIG. 3. A NURBS surface may then be automatically generated over the quadrangular patches, Block 430. As described above, this automatic decomposition operation preferably comprises decimating the first triangulated surface through a sequence of edge contractions that are prioritized by a quadratic error measure. The quadratic error measure may be based on a coefficient map that weights planes defined by triangles on the first triangulated surface by a geometric measure of the triangles, including one based on angles or area.

Referring still to FIG. 6, the structure of a quadrangulation can be measured in terms of angles and vertex degrees and local optimization operations can be performed, if necessary, to improve the quadrangulation by increasing structure, Block 411E. This local optimization operation includes the performance of multiple local transformations to increase structure and is preferably preceded by decimation and parametrization operations. As described more fully hereinbelow, the decimation operation identifies significant surface features, which are referred to as character lines and character points, and the parametrization operation maps them back to the original triangulation. These character lines and character points act as constraints that are respected during the operations of constructing a quadrangulation. Typical local transformations include edge slide, vertex rotation and face contraction. A local transformation is only permissible if it preserves the topological type of the surface defined by the quadrangulation.

By treating a surface as a 2-dimensional simplicial complex K in $\mathbb{R}^3$ a quadrangle can be treated as a topological disk (i.e., surface) bounded by four edges. If an edge bounds the disk on both sides then it is counted twice. The number different edges can therefore be four, three, or two. A quadrangle is simple if its boundary is a topological circle and the number of different edges is therefore four. A quadrangle is non-simple if its boundary circle is partially glued. A quadrangulation of a surface is an embedded graph so each face is a quadrangle. The graph can have loops and multiple edges. The "degree" of a vertex u counts the edges that share u as an endpoint and is denoted as $\alpha(u)$. A loop is counted twice in the degree of its endpoint. Vertices in the graph can have a degree as small as 1, but isolated vertices of degree 0 are not allowed.

A quadrangulation may be a structured mesh. In particular, a structured mesh is a quadrangulation with all vertices of degree four (4). The only 2-manifolds that have structured meshes are the torus and the Klein bottle. For this reason and because vertices at locations of high curvature on a surface demand degrees different from four (4), surfaces are stitched together from rectangular pieces of structured meshes. A carpet is a quadrangulated topological disk wherein all interior vertices have a degree of four (4), all but four boundary vertices have a degree of three (3) and the four exceptional boundary vertices have a degree of (2). A structured mesh implies a parametrization and thus provides significantly more global geometric information than an arbitrary quadrangulation. A vertex u is ordinary if $\alpha(u)=4$ and u is extraordinary of $\alpha(u) \neq 4$. The amount of structure in a quadrangulation increases as the percentage of ordinary vertices increases. Degree-4 vertices are favored.

Constructing a quadrangulation can be regarded as constrained optimization problem. For example, when a surface is decomposed into quadrangles, the surface features such as boundaries, valleys and ridges, and dips, saddles, peaks are respected. One aim in performing this constrained optimization is to construct quadrangulations with all face angles close to 90°. For a vertex in a flat area this means it should be ordinary. Vertices at surface features may demand degrees different from 4. Target degrees can be assigned with the goal of matching the degree with the angle around the vertex. If a target degree of vertex u is $\tau(u)$, then a signed deficiency can be defined as the difference between the actual and the target degree: $\alpha(u)-\tau(u)$. The deficiency of a quadrangulation Q is the sum of absolute signed deficiencies:

$$\Delta(Q)=\Sigma|\alpha(u)-\tau(u)|$$

The goal is to construct a quadrangulation that (i) respects feature elements, (ii) minimizes the deficiency and (iii) minimizes the number of quadrangles. Constraint (i) requires that the edges of the quadrangulation align with feature lines and that a vertex is placed at every feature point. Constraint (ii) is achieved by repeated application of local transformations. If each quadrangle is replaced by a carpet of $k^2$ smaller quadrangles then all old vertices retain their degrees and all new vertices are ordinary. Assuming four (4) is the default target degree of every new vertex, a finer quadrangulation with the same deficiency can be achieved. This is the reason for constraint (iii) which prefers quadrangulations having a smaller number of quadrangular patches over those having larger numbers of quadrangular patches.

Operations for modifying a given quadrangulation using local transformations will now be explained. The structure of a quadrangulation and the benefit of performing a local transformation are initially measured. A primary goal when constructing a quadrangulation is to decrease the deficiency $\Delta(Q)$ and a secondary goal is to decrease the number of quadrangles. Combining these two goals, a potential of a quadrangulation Q can be defined as:

$$\Phi(Q)=K\Delta(Q)+F(Q)$$

where F(Q) is the number of quadrangular patches and $K \geq 2$. The objective is to minimize the potential $\Phi(Q)$. For example, let $\wedge: Q \rightarrow R$ denote a transformation from Q to another quadrangulation R. The benefit is positive if and only if the deficiency drops by a positive amount or the deficiency $\Delta(Q)$ remains unchanged while the number of quadrangular patches F(Q) decreases. The use of local transformations such as diagonal slide and diagonal rotation to transform one simple quadrangulation of a closed surface into another simple quadrangulation is also disclosed in articles by A. Nakamoto, entitled "Diagonal Transformations and Cycle Parities of Quadrangulations on Surfaces," Journal of Combinatorial Theory, Series B, Vol. 67, pp. 202–211 (1996) and "Diagonal Transformations in Quadrangulations of Surfaces," Journal of Graph Theory, Vol. 21, No. 3, pp. 289–299 (1996), the disclosures of which are hereby incorporated herein by reference.

The above described embodiments also preferably perform hole filling operations in the event the initial triangulation of a model is generated from defective or incomplete point cloud data. Hole filling operations according to one embodiment preferably comprise detecting a hole within a first triangulated surface of an object by identifying a plurality of first triangles therein having respective first edges that are not shared by another triangle but collectively define a boundary around an enclosed area devoid of triangles. The hole is then initially filled with a second triangulated surface. This initial hole filling operation may be performed using conventional techniques, for example.

According to a preferred aspect of these hole filling operations, the quality of the second triangulated surface is then improved by (i) refining the second triangulated surface into a third triangulated surface having a higher density of triangles therein relative to the second triangulated surface and then (ii) decimating the third triangulated surface into a fourth triangulated surface having a lower density of triangles therein relative to the third triangulated surface. The fourth triangulated surface preferably has fixed vertices on the boundary and floating vertices off the boundary. This latter decimating operation is preferably performed using an algorithm that favors generation of equilateral triangles when edges of triangles in the third triangulated surface are contracted. This decimating operation may also use a preselected range of triangle densities as a constraint. A preferred algorithm that favors generation of equilateral triangles can include a quadric error measure that has been modified by adding the weighted or unweighted contribution of perpendicular bisectors. In particular, for each edge xy in $Lk\ \overline{ab}$, the perpendicular bisector is added to the quadric. As will be understood by those skilled in the art, the link of $\overline{ab}$ is the boundary of a set of all triangles incident to at least one vertex of an edge ab of a triangulation and each edge xy is a segment of the boundary, as illustrated by FIG. 14.

The fourth triangulated surface and a portion of the first triangulated surface surrounding the hole is then covered with a quadrangular NURBS patch. The floating vertices are then projected onto the quadrangular NURBS patch. These projected floating vertices and the fixed vertices can then be used to construct a fifth triangulated surface which in combination with the first triangulated surface reflects an accurate approximation of the object without the hole. According to another embodiment, a fifth triangulated surface may be generated from the fourth triangulated surface using an energy minimization operation that evaluates a local measurement of shape selected from the group consisting of dihedral angles between adjacent triangles, face angles around vertices and linearized expressions of curvature (e.g., discretized versions of derivatives and second derivatives along paths). Additional discussions of energy minimization techniques can also be found in an article by L. Hsu, et al., entitled "Minimizing the Squared Mean Curvature Integral for Surfaces in Space Forms," Experimental Math, Vol. 1 pp. 191–207 (1992); and by H. Hagen, S. Heinz and A. Nawotki, "Variational Design with Boundary Conditions and Parameter Optimized Surface Fitting", in *Geometric Modeling: Theory and Practice*, Strasser, Klein, Rau (eds.), Springer-Verlag, 3–13 (1997).

Figure 8:
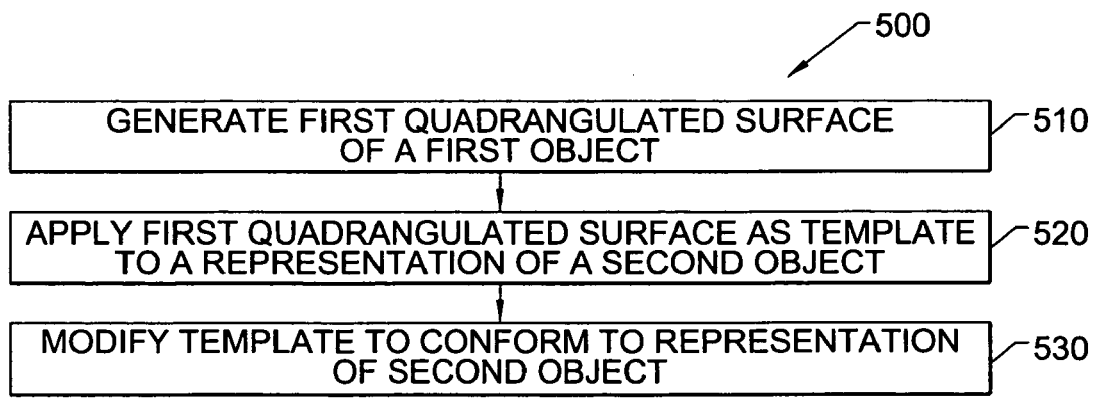
FIG. 8 is a flow diagram of preferred operations for generating quadrangulated surface models of models using templates.

According to still further embodiments of the present invention and as illustrated by FIG. 8, templates may be used to simplify operations for generating NURBS surfaces when working with polygonal models of related objects. In these embodiments, a first quadrangulation of a surface of a first object, Block 510, may be applied as a template to a point cloud or triangulated surface representation of a second object that is different from the first object, Block 520. The template may then be modified manually or automatically by adjusting a shape of the first patch boundary mesh associated with the first quadrangulation to more closely conform to the surface representation of the second object, Block 530.

In the foregoing sections, a thorough and complete description of preferred embodiments of the present invention have been provided which would enable one of ordinary skill in the art to make and use the same. Although unnecessary, a detailed mathematical treatment of the above-described operations will now be provided.

As described above, operations for performing surface remeshing include decomposing a triangulated model of an object into a quadrangulation that is defined by a first plurality of quadrangular patches that are joined together at first patch boundaries. The quadrangular patches typically meet in four around a vertex and they form large quadrangular domains within which all vertices have a degree exactly equal to four (4). These operations include the explicit construction of parametrizations that are obtained from simplicial homeomorphisms which connect different triangulations of the same surface.

In mechanical and other artwork designs, a typical surface consists of a few and large smooth patches that meet along pronounced feature lines and corners. The remeshing operation detects these features and integrates them into the construction automatically, while still allowing for manual input of additional lines of interest.

There are topological and numerical constraints that should be observed when decomposing a surface into quadrangular domains. For example, the Euler characteristic enforces an average vertex degree that differs from four (4) by a small constant depending on the topological type. Another example is the local curvature which favors or discourages vertices of degree less or greater than four (4). A preferred remeshing algorithm that addresses these constraints will now be described.

Simplifying a Curve

Curves in the plane are a lot simpler than surfaces in space, but they are interesting enough to serve as a meaningful illustration of the algorithm. For that purpose we consider a piecewise linear curve, $\gamma$, that is the image of a continuous map $[0, 1] \rightarrow \mathbb{R}^2$. We suppose $\gamma$ consists of n+1 vertices and n edges connecting contiguous vertices.

Hierarchy of curves. The input curve is simplified by an algorithm developed for triangulated surfaces. The ideas of that algorithm are general and apply to simplicial complexes of any dimension, and in particular to 1-complexes.

Figure 9:
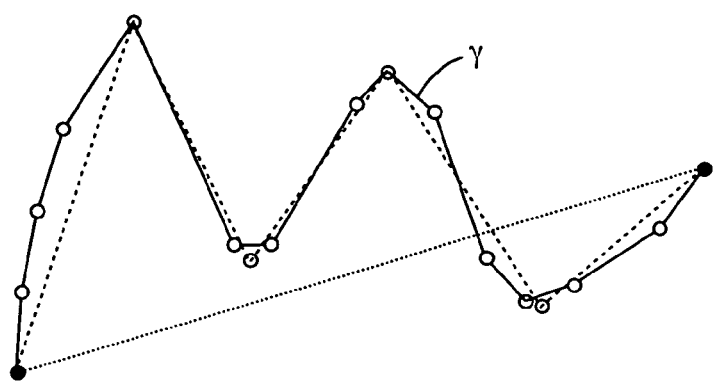
In FIG. 9, the solid curve is γ and the dashed and dotted curves are two approximations of γ.

The algorithm constructs a hierarchy of simplifications, see FIG. 9 which shows an input curve of 14 edges and simplifications consisting of 5 edges and of 1 edge. Think of the vertices of $\gamma=\gamma_0$ as the leaves of an ordered binary tree, see FIG. 10. Each cross-section of the tree corresponds to another piecewise linear curve, $\gamma_i$, and the fewer nodes there are the coarser is the approximation. The coarsest approximation that is still homeomorphic to $\gamma$ is the line segment $\gamma_{n-1}$ connecting the children of the root.

Figure 10:
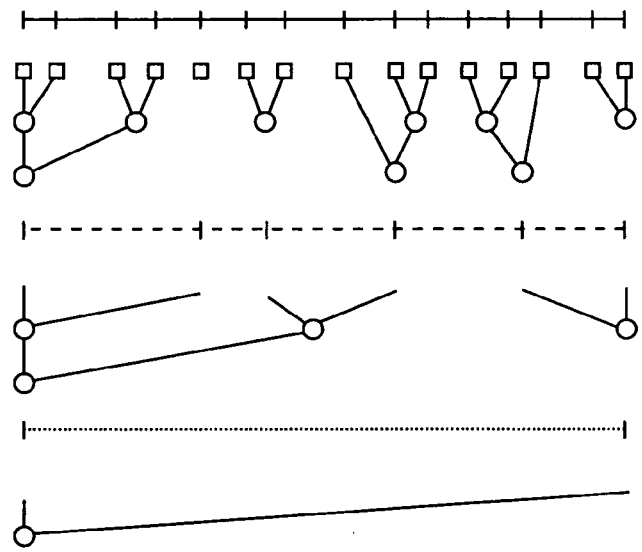
FIG. 10 illustrates binary tree simplifications. The three displayed cross-sections correspond to the curves shown in FIG. 9.

Edge contraction. The hierarchy is constructed by a greedy algorithm that repeatedly contracts an edge until none is left. A contraction ab→c is reflected in the data structure by adding c as a new node and by declaring it the parent of a and of b. The repeated application of this operation eventually leads to a tree as shown in FIG. 10. Geometrically, we think of the contraction as a simplicial map $\phi_i:\gamma_{i-1}\rightarrow\gamma_i$ that maps the entire edge ab to the vertex c. The edges to the left of a and to the right of b are mapped linearly to the edges to the left and right of c. Everywhere else $\phi_i$ is equal to the identity.

Simplicial maps. The hierarchy represents a sequence of n edge contractions, and the composition of any prefix is a simplicial map:

$$\psi_i = \phi_i \circ \ldots \circ \phi_2 \circ \phi_1 : \gamma_0 \rightarrow \gamma_i.$$

The second to the last composition, $\psi_{n-1}$, maps $\gamma_0$ to a line segment. The last composition, $\psi_n$, maps $\gamma_0$ to a point, and it is the only one that changes the topological type of $\gamma_0$.

Each node is the root of a subtree that represents a contiguous piece of $\gamma_0$. Specifically, the leaves of the subtree with root u form a contiguous sequence of vertices, and the edges they delimit contract to u. For later reference define H(u) as the set of lines that contain these edges and the at most two edges preceding and succeeding this sequence. In other words, H(u) contains all lines defined by edges in $\gamma_0$ that have at least one endpoint mapped to u.

Figure 11:
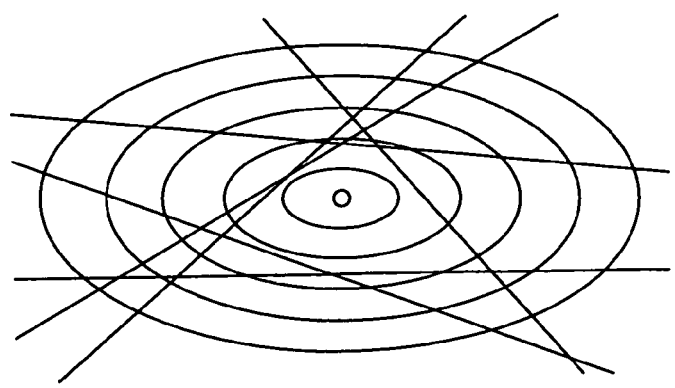
In FIG. 11, a sum of square distances from a finite collection of lines has concentric ellipses as level sets.

Prioritization. The edges are prioritized by a function that measures the error caused by the contraction. For each edge ab the new point c is the best point in the sense that it minimizes the sum of square distances to the lines in H(a) and in H(b). The error function is defined as the sum of square distances:

$$e(x) = \sum_{h \in H(a)} d(x, h)^2 + \sum_{h \in H(b)} d(x, h)^2$$
$$= Ax_1^2 + 2Bx_1x_2 + Dx_2^2 + 2Cx_1 + 2Ex_2 + F,$$

where $x=(X_1, X_2)$ and d(x, h) is the minimum distance between x and any point $y \in h$. It is quadratic and has cocentric ellipses as level sets, see FIG. 11. In the non-degenerate case there is a unique minimum, c, which lies at the common center of the ellipses. There is only one degenerate case, and it occurs when all lines are parallel. Algebraically, this case is characterized by $AD-B^2=0$. In this case the level sets are pairs of lines (or infinitely long ellipses) and there is a center line of minima.

Parametrizing a Curve

To parametrize $\gamma_0$ we decompose it into k segments, and for each segment we construct a homeomorphism from [0, 1]. That map is the inverse of a piece of a homeomorphism $\gamma_0 \rightarrow \gamma_{n-k}$ constructed using the hierarchy.

Topology of contraction. To construct a homeomorphism $\eta:\gamma_0 \rightarrow \gamma_{n-k}$ we specify isomorphic subdivisions of the edges modified by every contraction. If ab→c changes $\gamma_{i-1}$ to $\gamma_i$ then the isomorphic subdivisions define a simplicial homeomorphism $\iota_i:\gamma_{i-1}\rightarrow\gamma_i$. The contraction affects three edges in $\gamma_{i-1}$:za, ab, by, and two edges in $\gamma_i$:xc, cy, see FIG. 12. If a is an endpoints of $\gamma_{i-1}$ then xa and xc do not exist, and symmetrically if b is endpoint then by and cy do not exist. We stop the process when both a and b are endpoints for else the contraction would alter the topological type from curve to point. It follows there are only two cases to consider, namely one endpoint and no endpoint.

Isomorphic subdivision. Type R' in FIG. 13 illustrates the isomorphic subdivisions for the case where b is endpoint. It is the unique minimal construction where za, ab remain unchanged, xC is cut into xu, uc, and $x=\iota_i(x)$, $u=\iota_i(a)$, $c=\iota_i(b)$. Type L' is symmetric and belongs to the case where a is endpoint. For the no-endpoint case there are two minimal constructions: $c=\iota_i(b)$ as in Type R and $c=\iota_i(a)$ as in Type L. If we cannot make up our mind we create a non-minimal compromise as in Type M.

Numerics of contraction. As explained earlier, the greedy algorithm selects edge contractions by their numerical properties. Specifically, it uses a quadratic error function, $$e(x) = (x_1 \; x_2 \; 1) \begin{pmatrix} A & B & C \\ B & D & E \\ C & E & F \end{pmatrix} \begin{pmatrix} x_1 \\ x_2 \\ 1 \end{pmatrix},$$

and places the new vertex at its minimum. The 3-by-3 matrix contains numerical information that we also exploit to choose among the isomorphic subdivision types. In the topologically constrained one-endpoint cases any such considerations are mute, but in the unconstrained no-endpoint cases they are appropriate.

We can assume that ab→c has good numerical properties for else it has little chance to be selected by the greedy algorithm. Specifically, point c is reasonably close to all lines in H(a) and in H(b). Unless ab is very short this can only be the case if all lines in H(a) are almost collinear, or this is true for H(b), or for H(a)∪H(b). The first case is illustrated in FIG. 12 to the right and we construct isomorphic subdivisions of Type R. In the symmetric case we use Type L. In the ambiguous case illustrated in FIG. 12 to the left we use Type M.

Fuzzy rank classification. To numerically distinguish between the cases we measure the degree of degeneracy of e(x). Let $$Q = Q_c = \begin{pmatrix} A & B \\ B & D \end{pmatrix}$$

be the 2-by-2 submatrix that describes the shape of the error function. Q is symmetric and positive semidefinite and thus has two non-negative eigenvalues: $\lambda_1 \geq \lambda_2 \geq 0$. We define the condition number equal to four times the determinant over the square of the trace:

$$r(Q) = \frac{4 \cdot \det Q}{tr^2 Q} = \frac{4 \cdot \lambda_1 \lambda_2}{(\lambda_1 + \lambda_2)^2}.$$

If $\lambda_2 = \epsilon \lambda_1$ then $r(Q) = 4\epsilon/(1+\epsilon)^2$. Since $0 \leq \epsilon \leq 1$ we have $r(Q) \in [0, 1]$. Assuming the rank of Q is non-zero, $r(Q)=0$ corresponds to the degenerate case when $\lambda_2=0$ and $r(Q)=1$ corresponds to the case when $\lambda_1=\lambda_2$. The condition number can be computed without computing the eigenvalues: det $Q=AD-B^2$ and tr $Q=A+D$. To map the condition number to a fuzzy rank we use a constant $0<\delta<1$ and define $$R(Q) = \begin{cases} 2 \text{ if } r(Q) > \delta, \\ 1 \text{ if } r(Q) \leq \delta. \end{cases}$$

A reasonable choice for the constant is $\delta=0.33$ which roughly corresponds to $\epsilon=0.1$.

Rank evolution. Let $Q_a$ and $Q_b$ be the 2-by-2 matrices that describe the shape of the error functions for a and for b. The numerically likely cases for fuzzy rank evolutions denoted as $R(Q_a)|R(Q_b) \rightarrow R(Q_c)$ are

1|1→1, 1|2→2, 2|1→2.

The evolution 2|2→2 occurs only if ab is very short. The remaining evolutions are numerically possible but occur only as borderline cases. For example, 2|2→1 is unlikely because $Q_c=Q_a+Q_b$, so its condition number cannot be much smaller than the ones of $Q_a$ and $Q_b$. In the numerically likely cases the rank of $Q_c$ follows the ranks of $Q_a$ and $Q_b$. We therefore base the choice of subdivision type solely on $\varrho = R(Q_a)|R(Q_b)$:

case $\varrho$=1|2: subdivide with Type R.

case $\varrho$=2|1: subdivide with Type L.

case $\varrho$=1|1 or $\varrho$=2|2: subdivide with Type M.

We augment the hierarchy with enough information to recover the homeomorphism. Each non-leaf node c is the parent of two nodes, a and b, and we label c with the type $T(c) \in \{R, R', L, L', M\}$ of the isomorphic subdivision employed in the construction of $\iota_i$. Each leaf is labeled with □.

Remeshing a Curve

We find a new combinatorial structure to represent $\gamma_0$. In the case of curves this is just a sequence of k segments, but for surfaces we will consider more interesting structures such as meshes of quadrilaterals. We remesh $\gamma_0$ by computing the preimages of all vertices of $\gamma_{n-k}$ under the composition of the first n-k simplicial isomorphisms.

Searching for preimages. Suppose q is a point of $\gamma_{n-k}$ and consider the problem of tracing q back to its preimage $\eta^{-1}(q) \in \gamma_0$ using the $\iota_i^{-1}$. Let cy be the edge in $\gamma_{n-k}$ that contains q and let $\lambda \in [0, 1]$ so $q=(1-\lambda)c+\lambda y$. While the topology and fuzzy rank classification determine the type of isomorphic subdivision used, distances and lengths decide the proportions. We describe this in the most general case, which is Type M. The preimage of c is the nearest point $v=(1-\lambda_v)a+\lambda_v b$ on ab. The images of a and b are points $u=(1-\lambda_u)c+\lambda_u x$ on cx and $w=(1-\lambda_w)c+\lambda_w y$ on cy, which are chosen in proportion to available length:

$\lambda_v = \langle c-a, b-a \rangle / \langle b-a, b-a \rangle$;

if $\lambda_v<0$ then $\lambda_v=0$ endif;

if $\lambda_v>1$ then $\lambda_v=1$ endif;

$\lambda_u = \lambda_v \|a-b\| / (\lambda_v \|a-b\| + \|x-a\|)$;

$\lambda_w = (1-\lambda_v) \|b-a\| / ((1-\lambda_v) \|b-a\| + \|y-b\|)$.

The algorithm traverses two paths from the root- to the leaf-level, one for c and one for y. At all times c and y are contiguous in their cross-section, and we assume that c precedes y along the corresponding curve. Note that this assumption precludes T(c)=R' as a possibility. We also assume that c was created after y so the next step back in the hierarchy considers the children a and b of c and leaves y unchanged. The process continues until c and y are both leaves.

(vertex, vertex, float) $PMG(c, y, \lambda)$:

case $T(c) = R$: return $PMG(b, y, \lambda)$;

case $T(c) = L$ or $T(c) = L'$:

case $\lambda < \lambda_w$: return $PMG(a, b, frac\lambda\lambda_w)$.

case $\lambda \geq \lambda_w$: return $PMG(b, y, frac\lambda - \lambda_w 1 - \lambda_w)$.

case $T(c) = M$:

case $\lambda < \lambda_w$: return $PMG\left(a, b, \lambda_v + \frac{\lambda(1-\lambda_v)}{\lambda_w}\right)$.

case $\lambda \geq \lambda_w$: return $PMG\left(b, y, \frac{\lambda - \lambda_w}{1-\lambda_w}\right)$.

case $T(c) = \square$: return $(c, y, \lambda)$.

The running time is proportional to the number of vertices along the two paths, which is at most twice the height of the forest plus two. There is no explicit mechanism that limits the height, but our preliminary tests indicate that the forest is well balanced and its height is logarithmic in the number of leaves.

Inverses. In each case $\iota_i^{-1}(c)$ is a vertex or point of the edge ab, which is the preimage of c under $\phi_i$. We get a more global statement by composing maps. Recall that $\psi = \psi_{n-k}$ is the composition of n−k edge contractions, and that $\eta$ is the composition of the corresponding n−k simplicial isomorphisms:

$\psi = \phi_{n-k} \circ \ldots \circ \phi_2 \circ \phi_1$, $\eta = \iota_{n-k} \circ \ldots \circ \iota_2 \circ \iota_1$.

The preimages under the two maps are geometrically related. $\psi^{-1}$ exaggerates vertices at the expense of edges, while $\eta^{-1}$ maps edges to chains while limiting vertices to points.

FACT 1. $\eta^{-1}(u) \in \psi^{-1}(u)$ for every vertex u of $\gamma_{n-k}$, an $\psi^{-1}$ $\eta^{-1}(uv)$ for every open edge uv.

This observation generalizes to surfaces where it is a more interesting statement of duality between $\eta^{-1}$ and $\psi^{-1}$.

Hierarchy of Surfaces

This section discusses the simplification algorithm for 2-complexes in $\mathbb{R}^3$.

Edge contraction. In place of $\gamma = \gamma_0$ we now have a 2-complex $K = K_0$. After i edge contractions we obtain a 2-complex $K_i$. The contraction of an edge $ab \in K_{i-1}$ generates a new complex $K_i$ obtained by removing St $\overline{ab}$=St a ∪St b and adding the cone from a new vertex c to Lk $\overline{ab}$, see FIG. 14. Equivalently, we can think of the contraction as a simplicial map $\phi_i: |K_{i-1}| \to |K_i|$ induced by the vertex map $f_i: \text{Vert } K_{i-1} \to \text{Vert } K_i$ defined by $$f_i(u) = \begin{cases} u & \text{if } u \notin \{a, b\}, \\ c & \text{if } u \in \{a, b\}. \end{cases}$$

Just as in the case of curves we use a vertex-based data structure to represent the sequence of complexes and contractions.

Simplicial map. The composition of simplicial maps is again a simplicial map, namely the one induced by the composition of vertex maps. Suppose we generate a 2-complex $L = K_{n-k}$ in n−k contractions from $K = K_0$. The corresponding vertex and simplicial maps are $g = f_{n-k} \circ \ldots \circ f_2 \circ f_1: \text{Vert } K \to \text{Vert } L$, $\psi = \phi_{n-k} \circ \ldots \circ \phi_2 \circ \phi_1: |K| \to |L|$.

Both maps are represented by a binary forest whose leaves are the vertices of K and whose roots are the vertices of L, see FIG. 15. As for curves we grow the forest from a collection of leaves, which are the vertices of K. Each contraction ab→c adds c as a new node and declares it the parent of a and b. We could continue the process until only one vertex remains and the forest is a tree. However, since the part of the tree obtained after L is not used at all, we find it convenient to halt the process when the vertices of L are roots.

Homeomorphic map. $\psi$ fails to be homeomorphic because edge contractions are not injective. As for curves we can unfold ab→c using isomorphic subdivisions that only affect the local neighborhoods of $ab \in K_{i-1}$ and of $c \in K_i$. More specifically, these subdivisions are restricted to the stars of $\overline{ab}$ and of c, and they define a simplicial homeomorphism $\iota_i: |K_{i-1}| \to |K_i|$. How exactly these subdivisions are constructed is the topic of the next two sections. Simplicial homeomorphisms can be composed and we define $\eta = \iota_{n-k} \circ \ldots \circ \iota_2 \circ \iota_1: |K| \to |L|$, which is another simplicial homeomorphism. Because the unfolding process is local, we can use the binary forest that represents $\psi$ to also represent $\eta$, see FIG. 16. Again we augment the forest with a small amount of information that allows for the reconstruction of the $\iota_i$ when they are needed.

Topology of Contraction

This section describes the topological constraints to be observed in the construction of isomorphic subdivisions. We begin with some definitions.

Generalized boundary. For simplicity we assume $K_{i-1}$ is pure, that is, every edge and vertex belongs to a triangle. The order of $\sigma \in K_{i-1}$ is the minimum integer j=ord $\sigma$ so |St$\sigma$| is homeomorphic to the star of some (2−j)-simplex in a suitable 2-complex. For example, every triangle has order 0. An edge shared by l triangles has order 0 if l=2 and it has order 1 if l≠2. A vertex u can have order 0, 1, or 2. It has order 0 if its star is a disk, and it has order 1 if its star consists of l≠2 half-disks glued along two edges sharing u. Note that l=2 half-disks glued as described form a disk, and in this case ord u=0. In all other cases u has order 2. FIG. 17 shows a pure 2-complex with vertices of all possible orders. The j-th boundary consists of all simplices of order j or higher:

$Bd_j K_{i-1} = \{\sigma \in K_{i-1} | \text{ord}\,\sigma \geq j\}$.

The 1-st boundary contains only edges and vertices, and the 2-nd boundary contains only vertices. It is not difficult to see that the 1-st boundary is either empty or a complex, and similarly the 2-nd boundary is either empty or a complex. Another useful property is that the 2-nd boundary contains the 1-st boundary of the 1-st boundary: $Bd_1\, Bd_1 K_{i-1} Bd_2 K_{i-1}$. The significance of generalized boundary is its role in identifying edge contractions that change the topological type. These have to be avoided as they would destroy all homeomorphisms.

Preserving topology. The contraction of ab changes $K_{i-1}$ to $K_i$. The contraction can be made homeomorphic by local adjustments iff ab satisfies the link conditions stated in Fact 2 below. We explain what this means. Let E=Cl St $\overline{ab}$ and C=Cl St $\overline{ab}$ and Cl St c be the closures of the stars affected by ab→c, and let F=Lk $\overline{ab}$=E−St $\overline{ab}$ and D=Lk c=C−St c be the corresponding links. Note that F=D. Subdivisions Sd E of E and Sd C of C are transparent if F Sd E and D Sd C. We use isomorphic and transparent subdivisions of E and C to construct isomorphic subdivisions of $K_{i-1}$ and $K_i$:

$(K_{i-1}-E) \cup Sd \sim (K_i-C) \cup Sd\ C.$

These subdivisions require that the isomorphism |Sd E|→|Sd C| agrees with the identity along |F|. The isomorphic subdivisions finally define a simplicial homeomorphism $\iota_i: |K_{i-1}| \to |K_i|$. We refer to $\iota_i$ as a local unfolding of $\psi_i$ because it is a homeomorphism and it agrees with $\psi_i$ everywhere except inside |E|.

We still need some notation to formulate the link conditions. The links within $K_{i-1}$ and $Bd_1\ K_{i-1}$ are denoted as $Lk_0$ and $Lk_1$. We add cones from a dummy vertex, $\omega$, to the 1-st and 2-nd boundaries and consider links within these extended complexes. Specifically, $Lk_0^\omega$ denotes the link within $K_{i-1} \cup \omega \cdot Bd_1\ K_{i-1}$ and $Lk_1^\omega$ denotes the link within $Bd_1\ K_{i-1} \cup \omega \cdot Bd_2\ K_{i-1}$.

FACT 2. The following statements are equivalent.
(1) ab satisfies both link conditions:
   (1.1) $Lk_0^\omega\ a\ \cap Lk_0^\omega\ b = Lk_0^\omega\ ab$,
   (1.2) $Lk_1^\omega\ a\ \cap Lk_1^\omega\ b = \emptyset$.
(2) The contraction of ab has a local unfolding.

The simplification algorithm performs the contraction ab→c only if ab satisfies both link conditions, (1.1) and (1.2). By doing so it preserves the topological type of the complex and its 1-st and 2-nd boundaries. This is the natural place for the user to interact with the algorithm. A path is preserved as a feature of the surface by declaring its edges part of the 1-st boundary. A vertex is preserved as a feature point by declaring it part of the 2-nd boundary.

Isomorphic subdivisions. Boundaries discriminate edges and vertices by the topological type of their neighborhoods. Any homeomorphism therefore maps edges of $Bd_1\ K_{i-1}$ onto edges of $Bd_1\ K_i$, and similar for vertices. By Fact 2 we can restrict our attention to homeomorphisms that equal the identity outside |E| and |C|. In the construction of subdivisions of E and C we distinguish between five cases. In the first three cases we have ord ab=0. By condition (1.1) the order of at least one endpoint vanishes, and we assume this endpoint is a. In the last two cases we have ord ab=1. By condition (1.2) the order of at least one endpoint is the same, and we again assume this endpoint is a. The five cases are illustrated in FIG. 18. A more detailed case analysis follows.

Case 1. ord ab=ord a=0 and ord b=0. In the absence of any topological constraints we can map c to any point within the open disk. To avoid excessive subdivision we map c to a point $v = \iota_i^{-1}(c)$ on ab.
Case 2. ord ab=ord a=0 and ord b=1. We have ord c=ord b and can map c anywhere on the 1-st boundary within the open disk. It is most economical to map c to $b = \iota_1^{-1}(c)$.
Case 3. ord ab=ord a=0 and ord b=2. We have ord c=ord b and the only choice left is to map c to $b = \iota_i^{-1}(c)$.
Case 4. ord ab=ord a=1 and ord b=1. We have ord c=1 and can map it anywhere on the 1-st boundary, for example to a point $v = \iota_i^{-1}(c)$ on ab.
Case 5. ord ab=ord a=1 and ord b=2. We have ord c=2 and there is no choice left other than mapping c to $b = \iota_i^{-1}(c)$.

Observe the similarity to the subdivision types used for curves above. Vaguely, Type M corresponds to the subdivisions used in Cases 1, 4, and Types R and R' correspond to the subdivisions used in Cases 2, 3, 5. Types L and L' are symmetric to R and R' and they do not arise because the assumption ord ab=ord a breaks the symmetry.

Half-disks. The most constraining Case 5 is most convenient for constructing isomorphic subdivisions since it leaves the fewest choices.

In Case 4, the 1-st boundary decomposes E into half-disks glued along the common path xa, ab, by. Similarly, C is decomposed into the same number of half-disks glued along xc, cy. We therefore focus on the isomorphic subdivision of the two paths, see FIG. 19. This fixes the map on the boundary and we can complete it merely by subdividing the half-disks in their interiors. There are five types as for curves: R, R', L, L', M, see FIG. 13. Types R and R' both map c to $b = \iota_i^{-1}(c)$, Types L and L' are symmetric and map c to a, and Type M is a compromise that maps c to a point v∈ab. Note that the only triangles of E affected by the subdivision of Type R are the ones sharing vertex a. In other words, the effect of R is the same as that of R', see FIG. 19.

In Case 5 we get half-disks by restricting the construction of subdivisions to Cl St a and the corresponding portion of C, see Type R' in FIG. 19. This is possible because c is mapped to b so the rest of E and C are identical. Again we have a collection of half-disks around path xa, ab and another around the one-edge path xc. We construct isomorphic subdivisions of Type R' for each pair of corresponding half-disks.

Extreme half-disks. The half-disk construction is problematic if xab is one of the triangles, or symmetrically if ayb is a triangle. Because of planarity xba and ayb cannot both belong to the same half-disk. Since the two cases are symmetric we deal only with xab. As illustrated in FIG. 20, we resolve the case by mapping xba, xbz to the flipped configuration azx, azb. In other words, we cut xba and xbz along the new edge za and thus create a simplicial homeomorphism from xba, xbz to azx, azb. This idea works as long as there is a vertex z≠y that can be used for flipping xb. Otherwise, we pick a point z on the edge xy, cut xyb along zb, and flip xb to az, see FIG. 21.

Numerics of Contraction

This section reviews the numerical information used to select edges for contraction in the simplification algorithm. It also discusses related information that guides the construction of isomorphic subdivisions.

Fundamental quadric. For each vertex, edge, and triangle $\sigma \in K_{i-1}$ we consider a set of planes, H=H($\sigma$), and the error function that assumes the sum of square distances from the planes:

$$e_H(x) = \sum_{h \in H} d(x, h)^2 = x^T \cdot Q_H \cdot x,$$

where $x=(x_1, X_2, X_3)^T \in \mathbb{R}^3$, $X=(x_1, x_2, x_3, 1)^T$, and $Q_H$ is a symmetric, positive semidefinite 4-by-4 matrix usually referred to as the fundamental quadric. See FIG. 11 for an illustration of the error function in the 2-dimensional case. The set H contains all planes defined by triangles in $K=K_0$ that contract to a simplex in the star of a:

$H = \{h = aff \tau | \tau \in K^2,\ \psi_i(\tau) \in St\sigma\}.$

For example, if $\sigma$ is a triangle then St$\sigma = \{\sigma\}$, and it turns out there is exactly one triangle $\tau \in K$ with $\psi_i(\tau) = \sigma$. The initial fundamental quadrics pertain to simplices in K and are obtained by adding quadrics of planes: $Q_H = \Sigma_{h \in H}\ Q_{\{h\}}$.

The quadrics are maintained throughout the simplification process using the inclusion-exclusion principle: $Q_{H \cup G} = Q_H + Q_G - Q_{H \cap G}$.

Optimization and degeneracy. The simplification algorithm proceeds by selecting the edge ab and the new point $c \in \mathbb{R}^3$ that minimize $e_H(c)$, where $H = H(a) \cup H(b)$. For the selection of the appropriate subdivision type we are interested in the upper left 3-by-3 submatrix of the fundamental quadric:

$$Q_H = \begin{pmatrix} A & B & C \\ B & D & E \\ C & E & F \end{pmatrix}.$$

It defines the quadratic part of the degree-2 error function. $Q_H$ is symmetric because $Q_H$ is symmetric. Observe that $$x^T \cdot Q_H \cdot x = \sum_{h \in H} x^T \cdot v_h \cdot v_h^T \cdot x$$
$$= \sum_{h \in H} \langle x, v_h \rangle^2 \geq 0,$$

where $v_h$ is one of the two possible unit normals of h. In words, $Q_H$ is positive semidefinite, just as $Q_H$ is. $Q_H$ can be ill-conditioned, and we use a fuzzy classification to map it to its rank, which can be 1, 2, or 3. The three possible ranks are best illustrated by the endpoints of the unit normal vectors of planes in H, see FIG. 22. For fuzzy rank 3 the points are clustered within a small cap on the sphere of directions. For fuzzy rank 2 the points are clustered in two distinct caps, and for fuzzy rank 3 there are at least three pairwise distinct caps needed to cover the points.

Fuzzy rank classification. $Q = Q_H$ has three non-negative eigenvalues: $\lambda_1 \geq \lambda_2 \geq \lambda_3 \geq 0$. By construction the rank of Q is non-zero, so $\lambda_1 > 0$. To numerically distinguish between the three possible ranks, we define the condition numbers $$r_1(Q) = \frac{27 \cdot \det Q}{tr^3 Q} = \frac{27 \cdot \lambda_1 \lambda_2 \lambda_3}{(\lambda_1 + \lambda_2 + \lambda_3)^3},$$
$$r_2(Q) = \frac{3 \cdot dtr Q}{tr^2 Q} = \frac{3 \cdot (\lambda_1 \lambda_2 + \lambda_1 \lambda_3 + \lambda_2 \lambda_3)}{(\lambda_1 + \lambda_2 + \lambda_3)^2}.$$

It is not difficult to prove $0 \leq r_1(Q) \leq r_2(Q) \leq 1$. If the smallest eigenvalue, $\lambda_3$, is significantly smaller than the largest, $\lambda_1$, then $r_1(Q)$ is small but $r_2(Q)$ is still large unless the second largest eigenvalue, $\lambda_2$, is also significantly smaller than $\lambda_1$. The condition numbers can be computed without computing the eigenvalues:

$\det Q = ADF + 2 \cdot BEC - C^2 D - B^2 F - E^2 A,$ $dtr\, Q = AD - B^2 + DF - E^2 + AF - C^2,$ $tr\, Q = A + D + F.$ The fuzzy ranks are found by comparing both condition numbers with a constant $0 < \delta < 1$:

$$R(Q) = \begin{cases} 3 & \text{if } r_1(Q) > \delta, \\ 2 & \text{if } r_1(Q) \leq \delta \text{ and } r_2(Q) > \delta, \\ 1 & \text{if } r_2(Q) \leq \delta. \end{cases}$$

A reasonable choice for the constant is $\delta = 0.33$.

Rank evolution. We simplify notation by writing $R_H = R(Q_H)$. FIG. 22 supports the intuition that in a fuzzy sense the rank for a set of planes is constrained by the ranks for subsets:

$\max\{R_H, R_G\} \leq R_{H \cup G} \leq \max\{R_{H+R_G}, 3\}.$

We apply this reasoning to a contraction ab→c. We denote the corresponding evolution of ranks as $R_{H(a)}|R_{H(b)} \to R_{H(c)}$. After eliminating symmetric cases by assuming $R_{H(a)} \leq R_{H(b)}$ we have eight fuzzy rank evolutions satisfying the above inequalities. Three of them are numerically unlikely, either because H(a) and H(b) share planes, or because the contraction has large error. The remaining numerically likely evolutions are illustrated in FIGS. 22 and 23.

Case 1. 1|1→1. The triangles in E=Cl St$\overline{ab}$ all lie almost in the same plane.

Case 2. 1|2 →2. E bends sharply along a path that passes through b but does not contain ab.

Case 3. 1|3→3. E bends sharply along at least three paths emanating from b, and none of these paths contains ab.

Case 4. 2|2→2. E bends sharply along a path that passes through ab.

Case 5. 2|3→3. E bends sharply along at least three paths emanating from b. One of these paths contains ab and continues beyond a.

Observe the similarity between the classification of edge contractions obtained through topological and through numerical considerations.

Decomposing into half-disks. Recall the five cases of edge contractions illustrated in FIG. 18. We have general implementations only for Cases 4 and 5. With the exception of one minimal example shown in FIG. 24, Cases 1, 2, 3 are all reduced to 4, 5 using the fuzzy rank classification. We simplify notation by writing $Q_\sigma$ for $Q_{H(\sigma)}$.

Consider first the topologically unconstrained Case 1 where E=Cl St $\overline{ab}$ is a disk. Our aim is to cut E into two or more half-disks. Two half-disks lead to Case 4 and three or more half-disks lead to Case 5. To cut E we select ab, one additional edge ax out of a, and at least one additional edge by out of b. We can think of the selection process as promoting ab, ax, and all by to 1-st boundary. The link conditions in Fact 2 require x≠y for each selected edge by. To describe the algorithm let $St^1 p$ denote the set of edges with endpoint p, and let SHARPEST($St^1$ p) return the edge px∈$St^1$ p that maximizes $r_2(Q_{px})$.

select ab;
B=$St^1$ b−{ab}; select by =SHARPEST(B);
A=$St^1$ a−{ab, ay}; select ax=SHARPEST(A);
select all by ∈ B−{by, bx} with $R(Q_{by}) \geq 2$.

The reduction of Cases 2 and 3 is similar except that only two edges are selected: ab and ax. The link conditions require bx ∉$Bd_1 K_{i-1}$, and as shown in FIG. 24 there is one configuration where no ax can be selected. This is the only such configuration and isomorphic subdivisions can be constructed directly, without reduction to half-disks.

```
select ab; A=St¹ a-{ab};
while A≠∅ do ax=SHARPEST(A);
    if xb ∈ Bd₁ K_{i-1} then A=A-{ax}
    else select ax; exit
    endif
endwhile;
assert E is as in FIG. 24.
```

Searching the Hierarchy

The hierarchy is mostly used to search for preimages. We describe the algorithm first for points, then for line segments, and finally for graphs. Only the most general case of a Type M subdivision is considered.

Point to preimage. The basic problem is to construct for a point $q \in |C|$ its preimage $p = \iota_i^{-1}(q) \in |E|$, which is defined by the isomorphic subdivisions Sd E of E and Sd C of C. Instead of constructing the subdivisions explicitly we define them implicitly by specifying rules that map points to preimages. Let E' ⊆ E and C' ⊆ C be a pair of corresponding half-disks. The boundary of E' is a cycle of edges, $$xa, ab, by, yz_1, z_1z_2, \ldots, z_{k-1}x,$$

see FIG. 25. The first three edges form the base where half-disks are glued. The rest of the cycle is part of the link of $\overline{ab}$. It is convenient to set $z_0 = y$ and $Z_k = x$. The boundary of C' is the same cycle except for the new base xc, cy which is substituted for xa, ab, by. Because Sd E and Sd C are transparent, $\iota_i$ restricted to the half-cycle of edges $z_{i-1}z_i$ is the identity. To complete the specification of $\iota_i$ we first define it on the base and then in the interior of the half-disk.

Point on base. Mapping a point q on xc, cy to its preimage p on xa, ab, by is exactly the problem tackled in Section. Even the notation is the same so we can reuse the formulas for $\lambda_v, \lambda_u, \lambda_w$, and get $$v = \iota_i^{-1}(c) = (1-\lambda_v)a + \lambda_v b,$$

$$u = \iota_i^{-1}(a) = (1-\lambda_u)c + \lambda_u x,$$

$$w = \iota_i^{-1}(b) = (1-\lambda_w)c + \lambda_w y,$$

see FIG. 25. If q=c then of course p=v. Otherwise, q is either a point of cx or cy. Suppose first that $q = (1-\lambda)c + \lambda x$:

case $\lambda < \lambda_u$: return $p = \left(1 - \frac{\lambda}{\lambda_u}\right)v + \frac{\lambda}{\lambda_u}a.$ case $\lambda = \lambda_u$: return $p = a.$ case $\lambda > \lambda_u$: return $p = \left(1 - \frac{\lambda - \lambda_u}{1 - \lambda_u}\right)a + \frac{\lambda - \lambda_u}{1 - \lambda_u}x.$ The cases for $q = (1-\lambda)c + \lambda y$ are similar and can be obtained by substituting $\lambda_w$ for $\lambda_u$, b for a, and y for x.

Point in interior. A point q in the interior of |C'| either lies in the interior of an edge $cz_i$ or in the interior of a triangle $cz_{i-1}z_i$. In the latter case we write q as a convex combination of the three vertices:

$$q = \lambda c + \mu z_{i-1} + \nu z_i, \quad (1)$$

where $\lambda, \mu, \nu > 0$ and $\lambda + \mu + \nu = 1$. The former is the limit case where $\mu = 0$. To compute $p = \iota_i^{-1}(q)$ we map both C' and E' to the canonical situation illustrated in FIG. 25: $x \to (-1, 0)$, a, $u \to (-\lambda_u, 0)$, v, $c \to (0, 0)$, b, $w \to (\lambda_w, 0)$, $y \to (1, 0)$, and the remaining vertices are placed in equal intervals on the half-circle from $$z_i \to \left(\cos\frac{i\pi}{k}, \sin\frac{i\pi}{k}\right).$$

Point p is computed in three steps. First, we write q in coordinates of the canonical image plane using equation (1). Second, we determine the triangle of E' that contains q. Let m be the index of the vertex connected to both a and b. Function cw tests whether a sequence of three input points form a right-turn, and similarly function CCw tests whether they form a left-turn.

```
case cw(a, z_m, q) and ccw(b, z_m, q):
    return rst=abz_m.
case not cw(a, z_m, q): i=m+1;
    while not cw(a, z_i, q) do i++endwhile;
    assert i≤k; return rst=az_{i-1}z_i.
case not ccw(b, z_m, q): i=m-1;
    while not ccw(b, z_i, q) do i--endwhile;
    assert i≥0; return rst=bz_iz_{i+1}.
```

Third we express q as a convex combination of r, s, t. This is done by solving a linear system of three equations:

$$\lambda' + \mu' + \nu' = 1$$

$$r_1\lambda' + s_1\mu' + t_1\nu' = q_1$$

$$r_2\lambda' + s_2\mu' + t_2\nu' = q_2$$

The second two equations refer to the coordinates of r, s, t, q in the canonical image plane. To get the preimage point we return to the original vertices r, s, $t \in K_{i-1}$ and set $p = \iota_i^{-1}(q) = \lambda' r + \lambda' + \nu' t$.

Modified half-disk. It is possible that two glued half-disks imply contradicting requirements for the preimage of c: a and b. In this case we use a modified construction with angles smaller than straight at a and at b. Alternatively, we could flip one or more edges to reduce the case to the usual configuration.

Tracing Paths

This section extends the search algorithm from points to line segments and to paths.

Line segment to preimage. As one can imagine we get the preimage of a line segment qq' from the preimages of its endpoints, p and p'. We suppose the entire segment is part of a triangle in $K_i$: points q and q' can be at vertices, on edges, or inside the triangle. Map q, q', E' to the canonical image plane and locate the two points inside the two fans of triangles around a and around b. Next walk from the triangle of q to that of q' and cut qq' at crossings with edges $az_i$ and $bz_j$, see FIG. 26. Since qq' lies inside a single triangle of C' it can only cross edges of one fan. After cutting qq' consists of smaller segments, and each is subjected to the same procedure on the next level.

Eliminating break-points. The preimage computation for line segments can produce unnecessarily fine subdivisions. The reason are break-points that start out on edges and map to triangle interiors later. We eliminate such break-points as soon as they arise. Consider a graph G of segments drawn on $K_i$. In other words, G is a 1-dimensional subcomplex of a subdivision of $K_i$. A knee is a node $q \in G$ that belongs to exactly two segments of G and lies in the interior of a triangle in $K_i$, see FIG. 27. We eliminate q with neighbors x and y by substituting xy for xq, qy. The non-knee nodes remain and are eventually connected by straight segments.

The elimination of knees has a general tendency to smooth and untangle. However, we can conceive cases where it creates self-intersections. This can be repaired by a local relaxation operation that affects the nodes of G within the triangle and keeps nodes on edges fixed. Assuming no self-intersections, knee elimination can be expressed as the result of a simplicial homeomorphism $k_i:|K_i| \to |K_i|$. The restriction of $k_i$ to the edges of $K_i$ is the identity. We effectively interleave knee elimination operations with the other simplicial homeomorphisms:

$$\eta_8^{-1} = (k_0 \circ \iota_1^{-1}) \circ \ldots \circ (k_{n-k-1} \circ \iota_{n-k}^{-1}).$$

Parentheses are for emphasis only. We expect that $\eta_*^{-1}$ differs locally but occasionally noticeably from $\eta^{-1}$. Possibly, early knee elimination is a general smoothing operation and can be exploited in that capacity.

Quadrilateral Mesh

We use the search algorithm described above to map a mesh obtained from the simplified surface, $L=K_{n-k}$, back to the initial surface, $K=K_0$. We begin with the decomposition into quadrilateral domains and then proceed to the construction of structured meshes.

Greedy matching. A decomposition of $|L|$ into quadrilateral domains is constructed by matching triangles of L. The matching is rarely perfect and usually leaves isolated triangles. The final decomposition is obtained by cutting every edge into two edges, every quadrilateral into four quadrilaterals, and every triangle into three quadrilaterals, see FIG. 28. The triangles are matched greedily with a weighting function for edges, $w:L^1 \to \mathbb{R}$, guiding the process. Smaller weights are preferred over larger ones, and weight $\infty$ indicates the triangles sharing the edge are not eligible for being matched. Specifically, $w(ab)<\infty$ iff ord ab=0 and neither of the two triangles, abx and aby, has already been matched. Small weights are assigned if ab conflicts with few other possible matches and if the condition number of $Q_{ab}$ is small. Let e be the number of edges among ax, bx, ay, by with weight less than $\infty$. Then $w(ab)=1+\tau_2(Q_{ab})$ is a reasonable weighting function. If l=0 then ab has no competition and will be chosen eventually in any case.

```
while NONEMPTY( ) do ab=EXTRACTMIN( );
    if w(ab)<∞ then match abx, aby;
        for r s∈{ax, bx, ay, by} do
            if w(rs)<oo then w(rs)=∞;
                let r st∉{abx, aby};
                DECREASEKEY(rt, st)
            endif
        endf or
    endif
endwhile.
```

The triangle rst is unique because ord rs=0 so rs belongs to exactly two triangles and one is different from both abx and aby. Function DECREASEKEY decrements the weights of rt and st by 1 each because both lose a competitor, namely rs. At the same time it improves the positions of rt and st within the priority queue. We define $\infty-1=\infty$ so that decrementation does not alter any eligibility status.

Checkerboards. A quadrilateral domain, Q, can be decomposed into $k^2$ smaller quadrilaterals. We call this decomposition a checkerboard if it is generated by two families of k−1 lines with complete bipartite intersection pattern, see FIG. 29. The lines of each family connect points along opposite sides of Q. We construct checkerboards by first placing points on domain sides and then connecting them with lines.

We start the construction by computing k−1 points on a side ab. The placement of the points depends on the curvature of the preimage curve $\gamma=\eta^{-1}(ab)$. Specifically, we parametrize $\gamma$ in k segments using the algorithm for plane curves described in the first three sections. Since $\gamma:[0, 1] \to \mathbb{R}^3$ is a space curve we compute square distance from a line by adding square distances from two orthogonal planes passing through the line. The result of the remeshing algorithm are k−1 points along $\gamma$, which are mapped to points on ab using $\eta$. Half or more of the quadrilateral domains lie in planes and we can construct the checkerboard with straight line segments connecting the points on the sides in pairs. Half or less of the domains consist of two triangles in different planes glued along a diagonal. In these cases we also remesh the diagonal and we connect points along sides with points along the diagonal. Finally, the resulting mesh is mapped back to $|K|$ using $\eta^{-1}$.

Preimages

This section studies structural properties of the preimages under the maps $\psi, \eta:|K| \to |L|$.

Points and simplices. $\psi$ is surjective so the preimage of every point $x \in |L|$ is non-empty. Because $\psi$ is the composition of contractions, $\psi^{-1}(x)$ is contractible. This implies in particular that $\psi^{-x}(x)$ is connected. We define the preimage of a simplex as the preimage of its interior. Recall that g:Vert K→Vert L is the vertex map that defines $\psi$. If T Vert L so $\tau$=conv T then $\psi^{-1}(\tau)$ is the underlying space of $$K_\tau = \{\sigma = \text{conv } S \in K | g(S) = T\}.$$

It follows that dime $\sigma \geq \dim \tau$ for all $\sigma \in K_\tau$. For example, if r is a triangle, then $K_{96}$ contains only triangles, and because $|K_\tau|$ is non-empty and connected, $K_\tau$ can only contain exactly one triangle.

Vertex stars. Since stars are combinatorial notions of neighborhood it is interesting to study their overlap pattern. Let Q={St v|v∈Vert L} be the set of vertex stars. The nerve of Q is the system of subcollections with non-empty common intersection:

$$\text{Nrv } Q = \{X \subseteq Q | \cap X \neq \emptyset\}.$$

Two vertex stars overlap iff the two vertices are connected by an edge. Similarly, three vertex stars overlap iff the three vertices are connected by a triangle. In other words, Nrv Q is isomorphic to L. The same is true for the preimages of the vertex stars. Define the preimage of a set of simplices as the preimage of its underlying space, and let $P=\{\psi^{-1}(St\ v)|v \in \text{Vert } L\}$.

FACT 3. Nrv P is isomorphic to L.

Now we know almost everything we need to know about preimages under $\psi$. The preimages of the vertices are closed, contractible, and pairwise disjoint subsets of $|K|$. They cover all vertices but leave channels of edges and triangles in between. The preimages of the vertex stars are open, they cover the entire $|K|$, and each contains the preimage of the vertex. The preimages of the stars of two vertices intersect in the preimage of the star of the connecting edge. Similarly, the preimages of the stars of three vertices intersect in the preimage of the connecting triangle, see FIG. 30.

Duality between preimages. $\eta$ is a homeomorphism and so is its inverse. Hence $\eta^{-1}$ can be used to map L onto $|K|$. The preimage of a vertex is a point, that of an edge is a path, and that of a triangle is a disk. The preimages connect the same way as the simplices in L. By Fact 3, $\eta^{-1}(L)$ is an embedding of Nrv P on K. We show that there is also a direct geometric relationship between the preimages under the two maps.

Claim 4. The preimages of a simplex r E L satisfy the following subset relations:

(i) $\psi^{-1}(\tau)\eta^{-1}(St\tau)$.

PROOF. Recall that $\psi$ is the composition of n–k edge contractions and $\eta$ is the composition of the corresponding n–k simplicial homeomorphisms. It thus suffices to prove the subset relations for $\psi_i$ and $\iota_j$, for $1 \leq i \leq n-k$. There are five cases which are illustrated in FIG. 18 and the relations can be verified by inspection.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A computer-implemented method of modeling a three-dimensional surface of an object, comprising the steps of:
   generating from an initial triangulation of the surface, a hierarchy of progressively coarser triangulations of the surface by performing a sequence of edge contractions to the initial triangulation;
   connecting the triangulations in the hierarchy using homeomorphisms; and
   homeomorphically mapping edges of a triangulation in the hierarchy back to the initial triangulation.

2. The computer-implemented method of claim 1, wherein said mapping step comprises homeomorphically mapping edges of a coarsest triangulation in the hierarchy back to the initial triangulation.

3. The computer-implemented method of claim 2, wherein said mapping step is followed by the step of:
   converting the mapped coarsest triangulation to a quadrangulation by matching pairs of adjacent triangles in the mapped coarsest triangulation.

4. The computer-implemented method of claim 3, wherein the pairs of adjacent triangles are matched using a weighting function for edges of the triangles.

5. The computer-implemented method of claim 3, wherein said converting step comprises:
   decomposing an isolated triangle that cannot be matched in the mapped coarsest triangulation into three quadrangles; and
   decomposing a quadrangle derived from a matched pair of adjacent triangles into a mesh of four quadrangles.

6. The computer-implemented method of claim 3, further comprising the step of fitting a respective grid to each of a plurality of quadrangles in the quadrangulation by decomposing each of the quadrangles into $k^2$ smaller quadrangles, where k is a positive integer greater than one.

7. A computer-implemented method of modeling a three-dimensional surface of an object, comprising the steps of:
   generating from an initial triangulation of the surface, a hierarchy of progressively coarser triangulations of the surface by decimating the initial triangulation using a sequence of edge contractions that are prioritized by an error function that measures a respective error caused by the edge contractions in the sequence;
   connecting the triangulations in the hierarchy using homeomorphisms; and
   homeomorphically mapping edges of a coarsest triangulation in the hierarchy back to the initial triangulation.

8. The computer-implemented method of claim 7, wherein said generating step comprises generating a first triangulation from the initial triangulation by contracting a first edge in the initial triangulation and measuring a first error associated with the first edge contraction; and wherein said connecting step comprises generating a first simplicial homeomorphism for the first triangulation.

9. The computer-implemented method of claim 8, wherein said connecting step comprises generating the first simplicial homeomorphism for the first triangulation by determining a fuzzy rank of a submatrix of a fundamental quadric used by the error function to measure the first error.

10. A computer-implemented method of modeling a three-dimensional surface of an object, comprising the steps of:
    generating from an initial triangulation of the surface, a hierarchy of progressively coarser triangulations of the surface by repeatedly decimating the initial triangulation using a sequence of edge contractions that are prioritized by an error function that measures a respective error caused by each of the edge contractions in the sequence, until a coarsest triangulation having a target density of triangles therein is achieved;
    connecting the triangulations in the hierarchy using homeomorphisms; and
    homeomorphically mapping edges of the coarsest triangulation in the hierarchy back to the initial triangulation.

11. The computer-implemented method of claim 10, wherein said connecting step comprises generating a respective simplicial homeomorphism for each of the triangulations in the hierarchy by determining a respective fuzzy rank that is attributable to a corresponding edge contraction in the sequence giving rise to the respective triangulation.

12. The computer-implemented method of claim 11, wherein said mapping step is followed by the step of:
    converting the mapped coarsest triangulation to a quadrangulation by matching pairs of adjacent triangles in the mapped coarsest triangulation.

13. The computer-implemented method of claim 12, wherein the pairs of adjacent triangles are matched using a weighting function for edges of the triangles.

14. The computer-implemented method of claim 12, wherein said converting step comprises:
    decomposing an isolated triangle that cannot be matched in the mapped coarsest triangulation into three quadrangles; and
    decomposing a quadrangle derived from a matched pair of adjacent triangles into a mesh of four quadrangles.

15. The computer-implemented method of claim 12, further comprising the step of fitting a respective grid to a plurality of quadrangles in the quadrangulation by decomposing each of the plurality of quadrangles into $k^2$ smaller quadrangles, where k is a positive integer greater than one.

16. A computer-implemented method of generating a three-dimensional model of an object, comprising the steps of:
    decomposing an initial triangulation of the model into a quadrangulation of the model defined by a plurality of quadrangular patches that are joined together at patch boundaries by:
        generating from the initial triangulation of the model a hierarchy of progressively coarser triangulations of the model using a sequence of edge contractions to the initial triangulation;
        connecting the triangulations in the hierarchy using homeomorphisms;

homeomorphically mapping edges of a coarsest triangulation in the hierarchy back to the initial triangulation; and converting the mapped coarsest triangulation to the quadrangulation by matching pairs of adjacent triangles In the coarsest triangulation.

17. The computer-implemented method of claim 16, wherein said generating step comprises generating a first triangulation from the initial triangulation by contracting a first edge in the initial triangulation and measuring a first error associated with the first edge contraction; and wherein said connecting step comprises generating a first simplicial homeomorphism for the first triangulation.

18. The computer-implemented method of claim 17, wherein said mapping step comprises determining an inverse of a composition of the homeomorphisms.

19. A computer-implemented method of modeling a three-dimensional surface of an object, comprising the steps of:

converting a first triangulation of the surface into a second triangulation of the surface by contracting a first edge in the first triangulation;

determining a fuzzy rank associated with the first edge contraction; and determining a simplicial homeomorphism based on the fuzzy rank.

20. A computer-implemented method of modeling a three-dimensional surface of an object, comprising the step of:

converting an initial triangulation of the surface into a quadrangulation of the surface that is homeomorphic to the triangulation by:

generating from the initial triangulation a hierarchy of progressively coarser triangulations of the surface by performing a sequence of edge contractions to the initial triangulation; and mapping edges of a triangulation in the hierarchy back to the initial triangulation.

21. The computer-implemented method of claim 20, wherein said converting step further comprises converting the mapped triangulation to the quadrangulation by matching pairs of adjacent triangles in the mapped triangulation.

22. The computer-implemented method of claim 20, wherein said converting step comprises:

determining respective first homeomorphisms associated with each of the triangulations in the hierarchy:

determining a composition of the first homeomorphisms; and determining an inverse of the composition of the first homeomorphism.

23. A computer program product that models a three-dimensional surface of an object and comprises a computer-readable storage medium having computer-readable program code embodied in said medium, said computer-readable program code comprising:

computer-readable program code that generates from an initial triangulation of the surface, a hierarchy of progressively coarser triangulations of the surface by performing a sequence of edge contractions to the initial triangulation;

computer-readable program code that connects the triangulations in the hierarchy using homeomorphisms; and computer-readable program code that homeomorphically maps edges of a coarsest triangulation in the hierarchy back to the initial triangulation.

24. The product of claim 23, further comprising computer-readable program code that converts the mapped coarsest triangulation to a quadrangulation by matching pairs of adjacent triangles in the mapped coarsest triangulation.

25. A computer program product that models a three-dimensional surface of an object and comprises a computer-readable storage medium having computer-readable program code embodied in said medium, said computer-readable program code comprising:

computer-readable program code means that generates from an initial triangulation of the surface, a hierarchy of progressively coarser triangulations of the surface by decimating the initial triangulation using a sequence of edge contractions that are prioritized by a quadratic error function that measures a respective error caused by each of the edge contractions in the sequence;

computer-readable program code means that connects the triangulations in the hierarchy using homeomorphisms; and computer-readable program code means that homeomorphically maps edges of a coarsest triangulation in the hierarchy back to the initial triangulation.

26. The product of claim 25, wherein said means that generates comprises computer-readable program code means that generates a first triangulation from the initial triangulation by contracting a first edge in the initial triangulation and measuring a first error associated with the first edge contraction;

and wherein said means that connects comprises computer-readable program code means that generates a first simplicial homeomorphism for the first triangulation.

27. The product of claim 26, wherein said means that connects comprises computer-readable program code means that determines a fuzzy rank of a submatrix of a fundamental quadric used by the quadratic error function to measure the first error.

28. An apparatus that generates models of objects, comprising:

means for decomposing an initial triangulation of a model into a quadrangulation of the model defined by a plurality of quadrangular patches that are joined together at patch boundaries, said decomposing means comprising:

means for generating from the initial triangulation of the model a hierarchy of progressively coarser triangulations of the model using a sequence of edge contractions to the initial triangulation;

means for connecting the triangulations in the hierarchy using homeomorphisms;

means for homeomorphically mapping edges of a coarsest triangulation in the hierarchy back to the initial triangulation; and means for converting the mapped coarsest triangulation to the quadrangulation by matching pairs of adjacent triangles in the coarsest triangulation.

29. The apparatus of claim 28, wherein said decomposing means generates a first triangulation from the initial triangulation by contracting a first edge in the initial triangulation, measuring a first error associated with the first edge contraction, determining a first fuzzy rank associated with the first edge contraction and generating a first simplicial homeomorphism based on the first fuzzy rank.

30. The apparatus of claim 29, wherein said decomposing means determines an inverse of a composition of the homeomorphisms.

31. A computer-implemented method of modeling a three-dimensional surface of an object, comprising the steps of:
generating from an initial triangulation of the surface, a hierarchy of progressively coarser triangulations of the surface by performing a sequence of edge contractions to the initial triangulation using a greedy algorithm that selects edge contractions by their numerical properties;
connecting the triangulations in the hierarchy using homeomorphisms; and
homeomorphically mapping edges of a triangulation in the hierarchy back to the initial triangulation.

32. A computer program product comprising a computer-readable storage medium having computer-readable program code embodied in said medium, said computer-readable program code comprising:
computer-readable program code means configured to generate from an initial triangulation of a three-dimensional surface derived from measurement data collected by digitizing a physical object or sampling a digital representation of an object, a hierarchy of progressively coarser triangulations of the surface by decimating the initial triangulation using a sequence of edge contractions;
computer-readable program code means configured to connect the progressively coarser triangulations in the hierarchy using homeomorphisms;
computer-readable program code means configured to homeomorphically map edges of a triangulation in the hierarchy of progressively coarser triangulations back to the initial triangulation;
computer-readable program code means configured to convert the triangulation into a quadrangulation by matching pairs of adjacent triangles in the triangulation; and
computer-readable program code means configured to fit a respective grid to each of a plurality of quadrangles in the quadrangulation.

33. The computer program product of claim 32, wherein said computer-readable program code further comprises computer-readable program code means configured to generate a respective patch over each of the fitted grids associated with each of the plurality of quadrangles in the quadrangulation.

34. The computer program product of claim 32, wherein said computer-readable program code means configured to convert the triangulation into a quadrangulation comprises means to match the pairs of triangles using a weighting function for edges of the triangles.

35. An apparatus for modeling three-dimensional objects, comprising:
means configured to generate from an initial triangulation of a three-dimensional surface, a hierarchy of progressively coarser triangulations of the surface by decimating the initial triangulation using a sequence of edge contractions;
means for connecting the triangulations in the hierarchy using homeomorphisms;
means for homeomorphically mapping edges of a triangulation in the hierarchy of progressively coarser triangulations back to the initial triangulation;
means for converting the triangulation into a quadrangulation by matching pairs of adjacent triangles in the triangulation; and
means for fitting a respective grid to each of a plurality of quadrangles in the quadrangulation.

36. The apparatus of claim 35, further comprising means for generating a respective patch over each of the fitted grids associated with each of the plurality of quadrangles in the quadrangulation.

* * * * *

UNITED STATES PATENT AND TRADEMARK OFFICE
CERTIFICATE OF CORRECTION

PATENT NO. : 6,996,505 B1
DATED : February 7, 2006
INVENTOR(S) : Herbert Edelsbrunner et al.

It is certified that error appears in the above-identified patent and that said Letters Patent is hereby corrected as shown below:

Title page,
Item [74], *Attorney, Agent, or Firm*, change "Meyers" to -- Myers --.

Column 7,
Line 24, insert the following:
-- As will be appreciated by one of skill in the art, embodiments of the present invention may be embodied as methods, systems (apparatus), and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-reading program code means embodied in the medium. Any suitable computer-reading medium may be utilized including hard disks, CD-ROMs, optical storage devices, or magnetic storage devices. --.

Signed and Sealed this

Second Day of May, 2006

JON W. DUDAS
*Director of the United States Patent and Trademark Office*